United States Patent
Kusakabe et al.

(10) Patent No.: US 10,989,105 B2
(45) Date of Patent: Apr. 27, 2021

(54) FUEL INJECTION DEVICE

(71) Applicant: Hitachi Automotive Systems, Ltd., Hitachinaka (JP)

(72) Inventors: Ryo Kusakabe, Hitachinaka (JP); Takuya Watai, Hitachinaka (JP); Shirou Yamaoka, Hitachinaka (JP); Kiyotaka Ogura, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 112 days.

(21) Appl. No.: 16/075,027

(22) PCT Filed: Jan. 10, 2017

(86) PCT No.: PCT/JP2017/000365
§ 371 (c)(1),
(2) Date: Aug. 2, 2018

(87) PCT Pub. No.: WO2017/145527
PCT Pub. Date: Aug. 31, 2017

(65) Prior Publication Data
US 2019/0040790 A1 Feb. 7, 2019

(30) Foreign Application Priority Data
Feb. 24, 2016 (JP) .............................. JP2016-033057

(51) Int. Cl.
*F02B 23/10* (2006.01)
*F02M 61/18* (2006.01)
*F02B 17/00* (2006.01)

(52) U.S. Cl.
CPC .......... *F02B 23/104* (2013.01); *F02B 17/005* (2013.01); *F02M 61/18* (2013.01);
(Continued)

(58) Field of Classification Search
CPC ........... F02M 61/1813; F02M 61/1833; F02M 61/1826; F02M 61/1846; F02M 61/18;
(Continued)

(56) References Cited

U.S. PATENT DOCUMENTS 5,058,549 A * 10/1991 Hashimoto ............... F02B 1/04
123/298
5,163,621 A * 11/1992 Kato ..................... F02M 61/163
239/533.12

(Continued)

FOREIGN PATENT DOCUMENTS

JP S54-012626 1/1979
JP H03-237262 A 10/1991
(Continued)

OTHER PUBLICATIONS

International Search Report with English translation and Written Opinion issued in corresponding application No. PCT/JP2017/000365 dated Apr. 4, 2017.
(Continued)

*Primary Examiner* — Steven J Ganey
(74) *Attorney, Agent, or Firm* — Foley & Lardner LLP

(57) ABSTRACT

A fuel injection device is provided with reduced adherence of fuel spray with respect to an intake valve, a wall surface in an engine cylinder, or a piston. The fuel injection device includes a valve body and a seat surface to perform sealing of fuel cooperatively and injection holes. Inlet opening surfaces are formed on the seat surface. A first injection hole and a second injection hole arranged closest to the first injection hole. The first injection hole is larger than the second injection hole in an injection hole angle to be an angle formed by a normal direction of the seat surface and a center axis of the injection hole. The second injection hole
(Continued)

is larger than the first injection hole in an area of a cross-section perpendicular to the center axis of the injection hole.

9 Claims, 17 Drawing Sheets

(52) U.S. Cl.
CPC .... *F02M 61/1813* (2013.01); *F02M 61/1826* (2013.01); *F02M 61/1833* (2013.01); *F02M 61/1846* (2013.01); *F02B 2023/103* (2013.01); *F02B 2023/106* (2013.01)

(58) Field of Classification Search
CPC ............. F02M 61/1806; F02M 61/182; F02M 61/1866; F02B 23/104; F02B 17/005; F02B 2023/103; F02B 2023/106
USPC ....... 239/533.12, 552, 556, 558, 560, 585.1, 239/585.4, 585.5
See application file for complete search history.

(56) References Cited

U.S. PATENT DOCUMENTS

| | | | |
|---|---|---|---|
| 10,208,722 B2* | 2/2019 | Kato | F02M 51/06 |
| 2009/0025680 A1 | 1/2009 | Kihara et al. | |
| 2010/0237174 A1 | 9/2010 | Oomori et al. | |
| 2012/0305674 A1 | 12/2012 | Buehner et al. | |
| 2014/0130772 A1 | 5/2014 | Maeda et al. | |
| 2015/0021416 A1* | 1/2015 | Raney | F02M 61/1806 239/558 |

FOREIGN PATENT DOCUMENTS

| | | |
|---|---|---|
| JP | H08-232812 A | 9/1996 |
| JP | 2005-194929 A | 7/2005 |
| JP | 2007-085333 A | 4/2007 |
| JP | 2009-024683 A | 2/2009 |
| JP | 2010-249125 A | 11/2010 |
| JP | 2015-227622 A | 12/2015 |
| WO | WO-2013/008692 A1 | 1/2013 |

OTHER PUBLICATIONS

Japanese Office Action issued in application No. 2018-501021 dated Sep. 11, 2018.
Office Action issued in corresponding Japanese Application No. 2018-501021 dated Apr. 7, 2020, with English machine translation.

* cited by examiner

FUEL INJECTION DEVICE

TECHNICAL FIELD

The present invention relates to a fuel injection device, for example, a fuel injection device suitable for use in an internal combustion engine.

BACKGROUND ART

As a background art of this technical field, a fuel injection valve described in WO 2013/008692 A (PTL 1) is known. The fuel injection valve is a fuel injection valve that has a plurality of injection holes and injects fuel into a cylinder of an internal combustion engine. The fuel injection valve includes injection holes having large diameters for injecting the fuel toward a ring-shaped space including areas of strong tumble flows formed in the cylinder and injection holes having small diameters for injecting the fuel toward a space including areas of weak tumble flows formed in the cylinder (refer to Abstract). A spray from the injection hole having the large diameter has penetration force to the tumble flow stronger than that of a spray from the injection hole having the small diameter (refer to Abstract). Even if penetration is increased for the area of the strong tumble flow, a fluidity of air is high and the injected fuel cannot penetrate past the area, so that it is possible to prevent the fuel from adhering to a piston liner (refer to a paragraph 0037 of the specification). As a result, in the fuel injection valve of PTL 1, it is possible to reduce an adverse effect by the spray with the increased penetration (refer to Abstract).

CITATION LIST

Patent Literature

PTL 1: WO 2013/008692 A

SUMMARY OF INVENTION

Technical Problem

In the fuel injection device of the internal combustion engine, to suppress generation of unburned gas in exhaust gas, a system fuel pressure is increased to atomize particles of the injected fuel. As a result, it is possible to promote mixing of the injected fuel and air and to suppress the generation of the unburned gas. Alternatively, adhesion of the fuel spray to an inner portion of an engine cylinder is suppressed. As a result, unburned particles can be reduced.

Particularly, when a high fuel pressure is implemented for atomization, the penetration (travel distance) of the fuel spray increases, so that the injected fuel spray may easily adhere to an intake valve or a wall surface in the engine cylinder. Therefore, to reduce the unburned particles contained in the exhaust gas, it is required to shorten the penetration of the spray.

For example, as in the fuel injection valve of PTL 1, the hole diameter of the injection hole for injecting the fuel into the area where the tumble flow (air flow) is weak is decreased and the hole diameter of the injection hole for injecting the fuel into the area where the air flow is strong is increased, so that it is possible to reduce an adverse effect by the increased penetration.

However, even in the case where the hole diameter of the injection hole is decreased for penetration reduction, when a flow rate of the fuel is fast due to a high pressure of the fuel or the like, the fuel flow is separated from a wall surface of the injection hole and the flow rate of the fuel in an injection hole outlet does not become uniform, so that the penetration of the spray may increase.

An object of the present invention is to provide a fuel injection device in which fuel sprays hardly adhere to an intake valve, a wall surface in an engine cylinder, or a piston.

Solution to Problem

A fuel injection device according to the present invention for achieving the above object is a fuel injection device including a valve body and a seat surface to perform injection and sealing of fuel cooperatively and a plurality of injection holes of which inlet opening surfaces are formed on the seat surface. A first injection hole and a second injection hole arranged closest to the first injection hole, which configure the plurality of injection holes, are configured such that the first injection hole is larger than the second injection hole in an injection hole angle to be an angle formed by a normal direction of the seat surface and a center axis of the injection hole and the second injection hole is larger than the first injection hole in an area of a cross-section perpendicular to the center axis of the injection hole.

In addition, a fuel injection device according to the present invention for achieving the above object is a cylinder direct injection type fuel injection device including a valve body and a seat surface to perform injection and sealing of fuel cooperatively and a plurality of injection holes of which inlet opening surfaces are formed on the seat surface. The plurality of injection holes include a third injection hole to inject a spray oriented to the side of a piston moving in a cylinder and two fourth injection holes arranged at positions sandwiching the third injection hole, in a circumferential direction around a center of the seat surface, and the fourth injection hole is larger than the third injection hole in an area of a cross-section perpendicular to a center axis of the injection hole.

Advantageous Effects of Invention

According to the present invention, a first injection hole and a second injection hole are configured such that the first injection hole is larger than the second injection hole in an injection hole angle to be an angle formed by a normal direction of a seat surface and a center axis of the injection hole and the second injection hole is larger than the first injection hole in an area of a cross-section perpendicular to the center axis of the injection hole. As a result, it is possible to provide a fuel injection device in which penetration of fuel sprays injected from the first injection hole can be shortened and the fuel sprays hardly adhere to an intake valve, a wall surface in an engine cylinder, or a piston.

In addition, according to the present invention, an area of a cross-section perpendicular to the center axis of the injection hole in a fourth injection hole is configured to be larger than that in a third injection hole to inject a spray oriented to the side of a piston. As a result, it is possible to provide a fuel injection device in which fuel sprays injected from each injection hole can be appropriately arranged and the fuel sprays hardly adhere to an intake valve, a wall surface in an engine cylinder, or a piston.

Other problems, configurations, and effects will be apparent from the following description of embodiments.

DESCRIPTION OF EMBODIMENTS

Hereinafter, operations and configurations of fuel injection devices (fuel injection valves) according to embodiments of the present invention will be described using FIGS. 1 to 17.

First Embodiment

Figure 1:
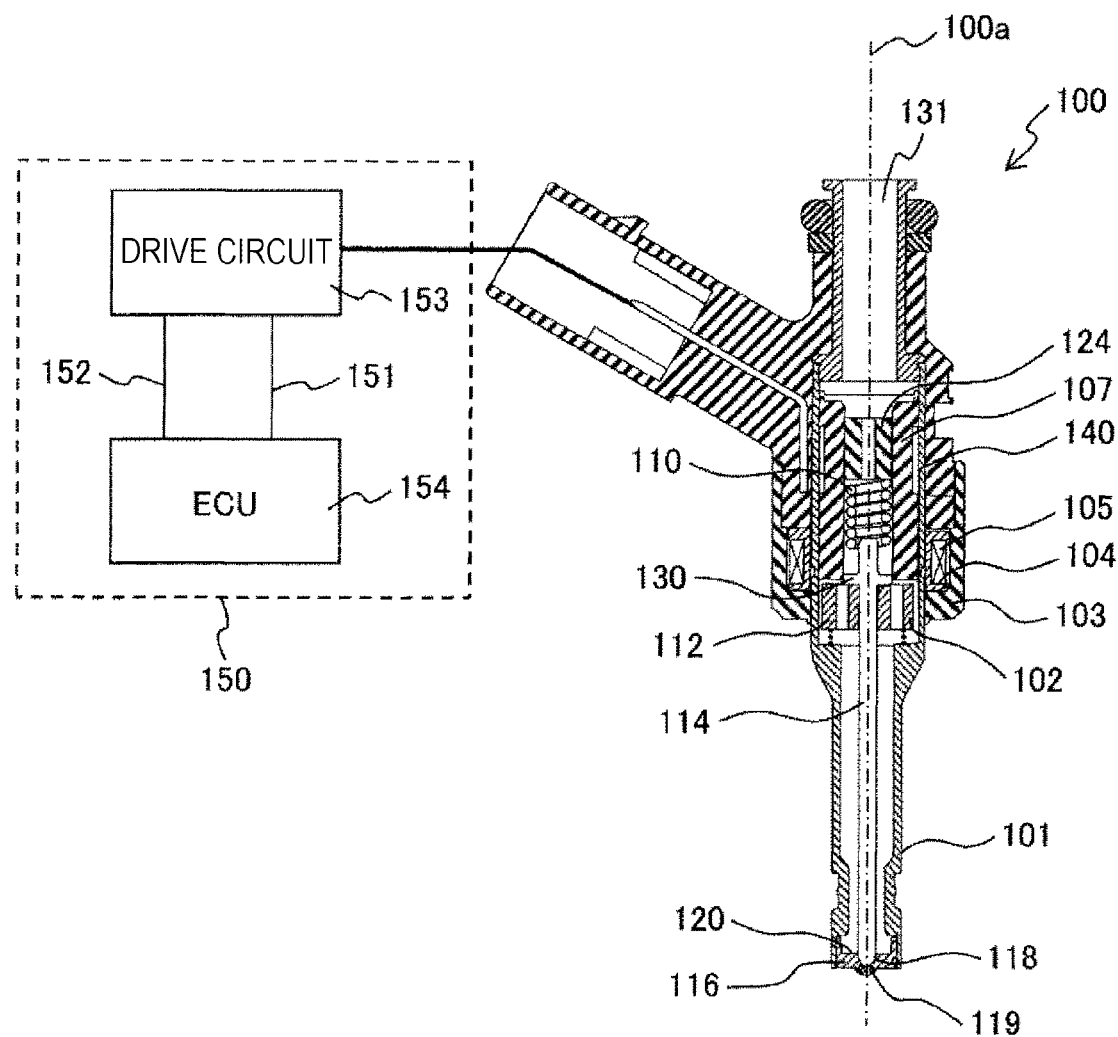
FIG. 1 is a diagram showing a fuel injection system configured to include a fuel injection device according to an embodiment (first embodiment) of the present invention and an ECU and the fuel injection device shows a longitudinal cross-sectional view.

First, a configuration and an operation of a fuel injection device according to a first embodiment of the present invention will be described using FIG. 1. FIG. 1 is a diagram showing a fuel injection system configured to include a fuel injection device according to an embodiment (first embodiment) of the present invention and an ECU and the fuel injection device shows a longitudinal cross-sectional view.

In FIG. 1, a center axis of a fuel injection device 100 is shown by 100a. The center axis 100a is matched with a center axis of a valve body 114 along a drive direction (valve opening/closing direction) of the valve body 114. In the following description, a vertical direction is defined on the basis of a vertical direction in FIG. 1. The vertical direction is not related to a vertical direction in a mounting state of the fuel injection device 100.

A fuel injection of the fuel injection device 100 is controlled by a width of an injection pulse transmitted from an engine control unit (ECU) 154 and the injection pulse is input to a drive circuit 153 of the fuel injection device 100. The drive circuit 153 determines a drive current waveform on the basis of a command from the ECU 154 and supplies a drive current of the drive current waveform to the fuel injection device for a time based on the injection pulse. The drive circuit 153 may be mounted as a component or substrate integrated with the ECU 154. In this embodiment, the drive circuit 153 and the ECU 154 are integrally configured and an integrated device is referred to as a drive device 150. The drive circuit 153 and the ECU 154 may be configured separately or the drive circuit 153 and the ECU 154 that are configured separately may be collectively referred to as the drive device 150.

Next, configurations and basic operations of the fuel injection device 100 and the drive device 150 thereof will be described.

The ECU 154 receives signals showing a state of the engine from various sensors and operates injection timing or a width of the injection pulse to control an injection amount from the fuel injection device 100 in accordance with operating conditions of the internal combustion engine. In addition, an A/D converter and an I/O port to receive signals from the various sensors are included in the ECU 154. The injection pulse output from the ECU 154 is input to the drive circuit 153 of the fuel injection device 100 through a signal line 151. The drive circuit 153 controls a voltage applied to a solenoid 105 and supplies a current to the solenoid 105. The ECU 154 communicates with the drive circuit 153 through a communication line 152 and can switch the drive current generated by the drive circuit 153 according to a pressure of fuel or the operation conditions supplied to the fuel injection device 100 or can change setting values of the current and the time.

Next, a configuration and an operation of the fuel injection device 100 will be described.

The fuel injection device 100 of FIG. 1 is normally a closed valve type electromagnetic fuel injection device. In a state where the coil 105 is not energized, the valve body 114 is biased by means of a spring (first spring) 110 and is closely attached to a valve seat 118 to enter a closed state (closed valve state). In this closed state, a movable element 102 is closely attached to the valve body 114 by means of a zero spring (second spring) 112. In addition, in this closed state, the fuel injection device 100 has a gap between the movable element 102 and a magnetic core 107.

The fuel is supplied from a fuel supply port 131 provided in an upper portion of the fuel injection device 100. In the closed state, a tip of the valve body 114 comes into contact with the valve seat and the fuel is sealed by the valve body 114 and the valve seat 118. When the valve is closed, force by the spring 110 and force by the fuel pressure act on the valve body 114 and the valve body 114 is pushed in a closing direction. A magnetic circuit for generating electromagnetic force for the opening/closing valve is configured to include a nozzle holder 101, the magnetic core 107, the movable element 102, and a housing 103. The nozzle holder 101 is a cylindrical member disposed on the outer circumferential side of the magnetic core (fixed core) 107 and the movable element (movable core) 102. The housing 103 is a member that covers an outer circumference of the coil 105.

If the current is supplied to the coil 105, a magnetic flux is generated in the magnetic circuit and magnetic attractive force is generated between the movable element 102 to be a movable component and the magnetic core 107 to be a fixed component. If the magnetic attractive force acting on the movable element 102 exceeds the magnitude of a sum of a load by the spring 110 and force acting on the valve body 114 by the fuel pressure, the movable element 102 moves upward (the side of the magnetic core 107 and the valve opening direction). At this time, the valve body 114 moves upward together with the movable element 102 and moves until an upper end face of the movable element 102 collides with a lower end face of the magnetic core 107. As a result, the valve body 114 is separated from the valve seat 118 and the fuel supplied to the fuel injection device 100 is injected from a plurality of injection holes (injection ports) 119.

Next, after the upper end surface of the movable element 102 collides with the lower end surface of the magnetic core 107, the valve body 114 is separated from the movable element 102 and overshoots. However, after a certain time, the valve body 114 stands still on the movable element 102.

When the supply of the current to the coil 105 is cut off, the magnetic flux generated in the magnetic circuit decreases and the magnetic attractive force decreases. If the magnetic attractive force becomes smaller than force corresponding to a sum of the load by the spring 110 and the fluid force received by the valve body 114 and the movable element 102 by the fuel pressure, the movable element 102 and the valve body 114 move downward (the side of the valve seat 118 and the valve closing direction). When the valve body 114 collides with the valve seat 118, the movable element 102 is separated from the valve body 114 and continues to move downward. However, after a constant time, the movable element 102 stands still on the valve body 114. On the other hand, after the valve body 114 collides with the valve seat 118, the valve body 114 stands still and the fuel injection stops.

The movable element 102 and the valve body 114 may be integrally formed as the same member or may be formed as separate members and coupled by a method such as welding or press fitting. An injection hole formation member 116 having the plurality of injection holes 119 and having a bottomed cylindrical shape (cup shape) is coupled to the nozzle holder 101 and the injection hole formation member 116 has a guide portion 120 to regulate the movement of a radial direction of the valve body 114. In FIG. 1, the injection hole formation member 116 and the guide portion 120 are integrally formed, but they may be separate members. The valve body 214 is configured such that the movement of the radial direction is regulated in two places of the guide portion 120 and an inner diameter portion of the magnetic core 107 on which a flange portion 130 of the valve body 114 slides and an operation (displacement) is enabled in the valve opening/closing direction.

When the movable element 102 and the valve body 114 are the same member, the zero spring 112 becomes unnecessary. However, an effect of the present invention in sealing and injection of the fuel does not change.

Next, a configuration of this embodiment and a problem of the fuel injection device will be described using FIGS. 2 to 7.

Figure 2:
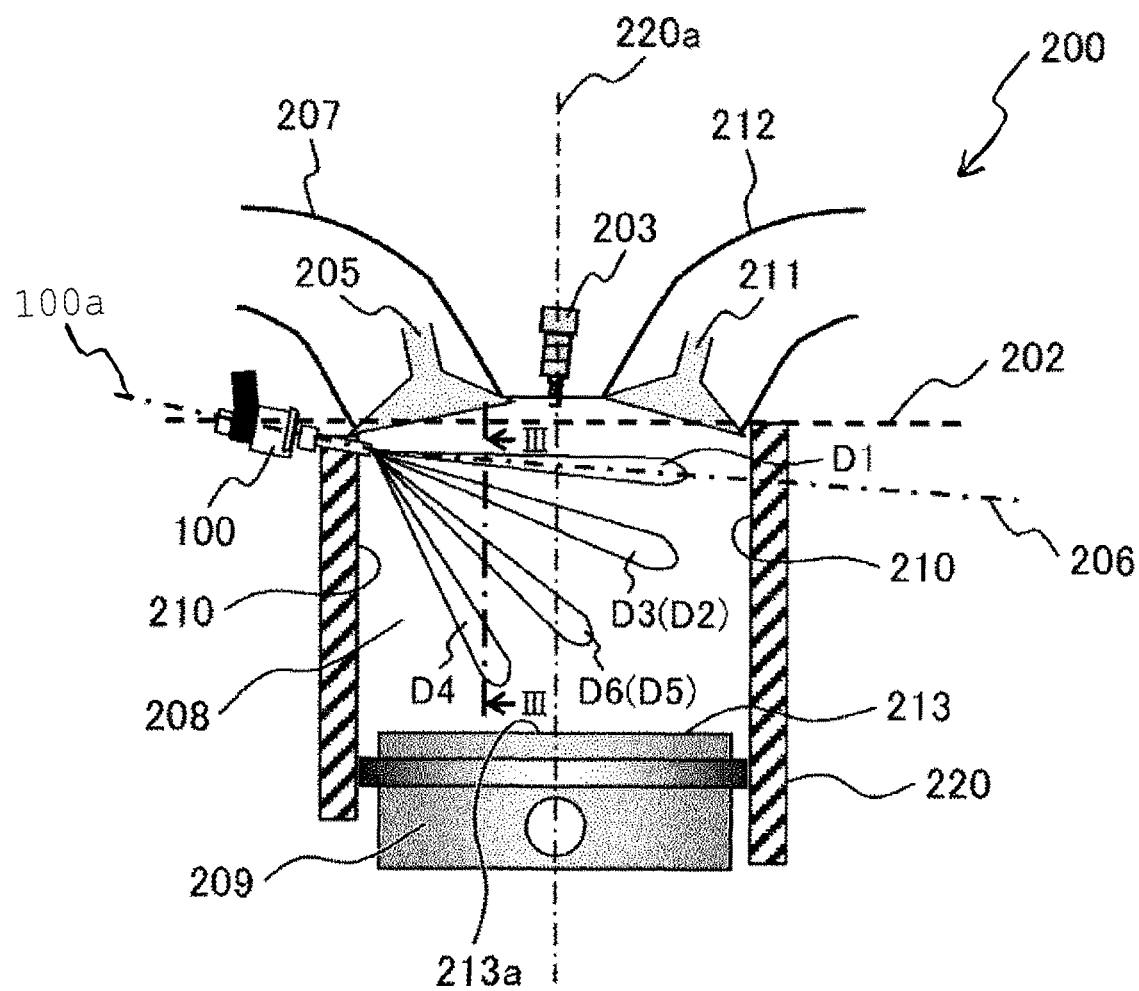
FIG. 2 is a schematic diagram of a cylinder direct injection type internal combustion engine (direct injection engine) that directly injects fuel into a cylinder in accordance with the embodiment (first embodiment) of the present invention.
Figure 3:
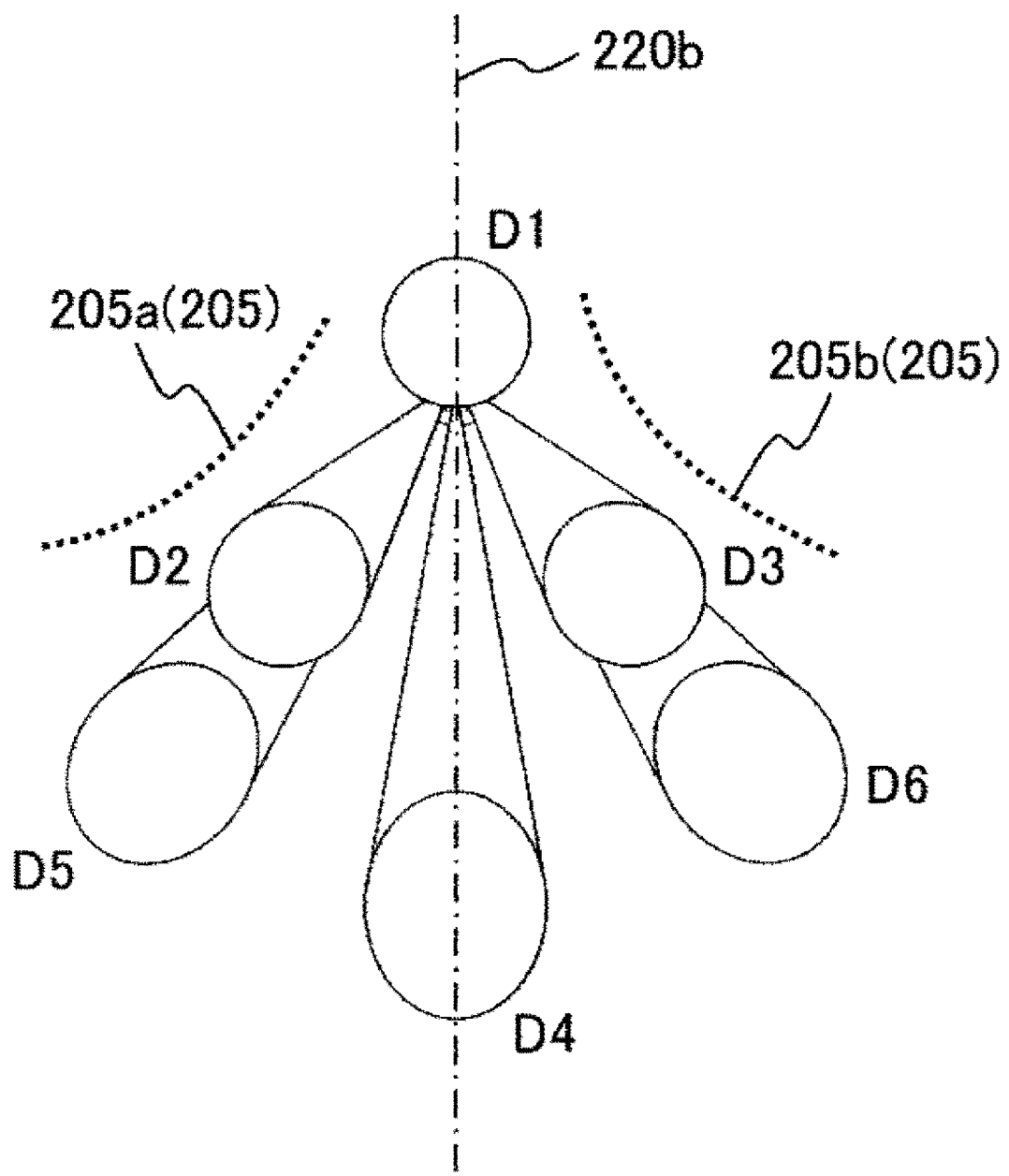
FIG. 3 is a projection view of fuel sprays injected from injection holes when viewed in a direction of the fuel injection device from a cross-section taken along III-III of FIG. 2 in accordance with the embodiment (first embodiment) of the present invention.

FIG. 2 is a schematic diagram of a cylinder direct injection type internal combustion engine (direct injection engine) that directly injects fuel into a cylinder in accordance with the embodiment (first embodiment) of the present invention. FIG. 3 is a projection view of fuel sprays injected from injection holes when viewed in a direction of the fuel injection device from a cross-section taken along III-III of FIG. 2 in accordance with the embodiment (first embodiment) of the present invention.

As shown in FIG. 2, a direct injection engine 200 according to this embodiment is configured to include a fuel injection device 100, an intake valve 205, an ignition plug 203, an exhaust valve 211, an intake pipe 207, an exhaust pipe 212, a piston 209, and a cylinder 220 including the piston 209. The fuel injection device 100 is attached to a cylindrical member configuring the cylinder 220. A total of two intake valves 205 are attached to both left and right sides, respectively, with a virtual plane (cross-section shown in FIG. 2) 220b including a center axis 220a of the cylinder 220 and the fuel injection device 100 as a center.

In this embodiment, the intake valve 205 is attached to the same cross-section as the fuel injection device 100. In addition, the center axis 100a of the fuel injection device 100 is parallel to the virtual plane 220b and exists on the virtual plane 220b.

First, an operation of the direct injection engine 200 will be described.

After the intake valve 205 is opened, the air having passed through the intake pipe 207 is guided to an engine cylinder 208 and the fuel is injected from the fuel injection device 100 according to the flow of the introduced air. Injected fuels D1 to D6 are mixed with the air by the flow of the air guided to the engine cylinder 208 to form an air-fuel mixture. Thereafter, at timing when the piston 209 approaches a top dead center, the air-fuel mixture is ignited by the ignition plug 203, so that the air-fuel mixture is burned and a thrust is obtained.

The fuel injection device 100 is attached to a cylinder inner wall surface 210 in the cylinder 220 close to the intake valve 205 to promote mixing of the introduced air and the fuel. To prevent interference with the intake valve 205, an attachment angle of the fuel injection device 100 is set such that the center axis 100a of the fuel injection device 100 extends downward (toward the side of the piston 209) in a range of 5 to 30 degrees with respect to a horizontal axis 202 in the cylinder of the engine 200.

By increasing an angle of the intake valve 205, that is, by raising the intake valve 205, the attachment angle of the fuel injection device 100 can be increased. However, because a pressure loss of the intake pipe 207 increases and the tumble to be the flow of the air descending and ascending in the axial direction of the piston 209 is obstructed, a degree of homogeneity of the air-fuel mixture may decrease and PN may increase. As a result, it is necessary to reduce an angle of the intake pipe 207 and the attachment angle of the fuel injection device 100 is determined according to a restriction of the angle of the intake pipe 207. Therefore, to prevent interference with the intake pipe 207, the fuel injection device 100 is preferably arranged such that an angle of the center axis 100a of the fuel injection device 100 with respect to the horizontal axis 202 in the engine cylinder becomes small.

As shown in FIGS. 2 and 3, fuel sprays injected from the fuel injection device 100 include six sprays D1 to D6. Furthermore, in this embodiment, the sprays D1 to D6 are distinguished into four sprays of first to fourth sprays. One spray D1 configures the first spray. The two sprays D2 and D3 configure the second spray. One spray D4 configures the third spray. The two sprays D5 and D6 configure the fourth spray.

The first spray D1 is injected to be oriented to the side of the ignition plug 203. The second sprays D2 and D3 are divided into both left and right sides with respect to the first spray D1 and are injected in a neighboring direction of the intake valves 205a and 205b. That is, the sprays D2 and D3 of the second sprays are injected diagonally in the neighboring direction of the intake valves 205a and 205b. The third spray D4 is injected in the direction of the piston 209. The fourth sprays D5 and D6 are injected into a portion on a crest surface of the piston 209, such that the fourth sprays are divided into both left and right sides of the third spray D4 and are arranged above the third spray D4. That is, the fourth sprays include the spray D5 and the spray D6 oriented in a diagonal direction of the piston 209.

More specifically, the spray D1 is formed by the fuel injected beneath (directly below) the ignition plug 203 in proximity to the ignition plug 203. Therefore, the spray D1 is injected at a position closest to the ignition plug 203, as compared with the other sprays D2 to D6. The sprays D2 and D3 are formed by the fuel injected on both left and right sides beneath the spray D1 with the virtual plane (cross-section shown in FIG. 2) 220b therebetween.

On the other hand, the spray D4 is formed by the fuel injected above (directly above) a center portion of the crest surface of the piston 209 in proximity to the crest surface of the piston 209. Therefore, the spray D4 is injected at a position closest to the crest surface of the piston 209, as compared with the other sprays D1 to D3, D5, and D6. The sprays D5 and D6 are formed by the fuel injected on both left and right sides above the spray D4 with the virtual plane (cross-section shown in FIG. 2) 220b therebetween.

Particularly, in this embodiment, the sprays D1 and D4 are located on the virtual plane 220b. In addition, the spray D2 and the spray D3 are injected at positions plane-symmetrical to the virtual plane 220b and the spray D5 and the spray D6 are injected at positions plane-symmetrical to the virtual plane 220b.

A center axis 206 of the first spray D1 oriented to the side of the ignition plug 203 forms an angle of about 0 to dozens of degrees with respect to the center axis 100a of the fuel injection device 100, from a relation of the attachment position of the fuel injection device 100 and the attachment position of the ignition plug 203.

Next, a configuration of the injection hole formation member 116 of the fuel injection device 100 will be described using FIGS. 4 to 7.

Figure 4:
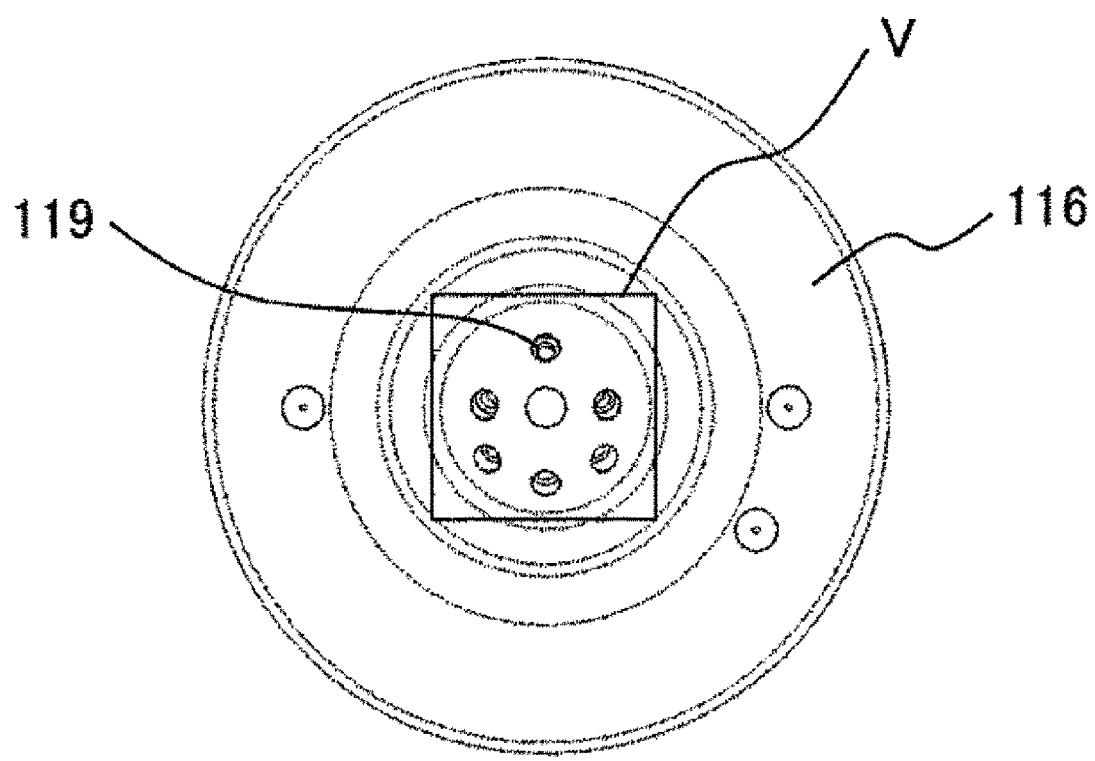
FIG. 4 is a plan view of an injection hole formation member of the fuel injection device according to the embodiment (first embodiment) of the present invention, when viewed from an apical direction.
Figure 5:
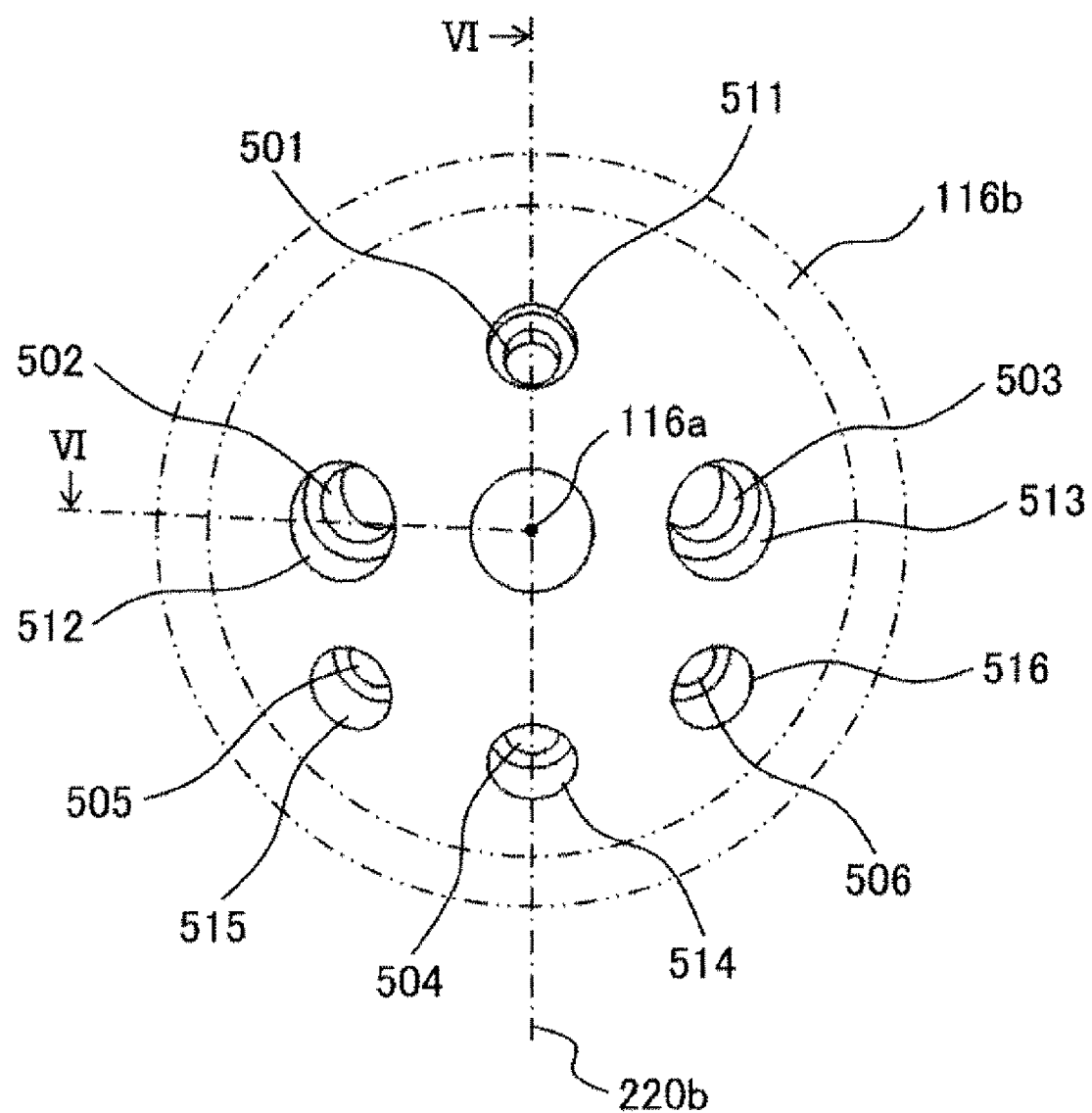
FIG. 5 is an enlarged view of the vicinity of injection holes of the injection hole formation member according to the embodiment (first embodiment) of the present invention and is an enlarged plan view of a portion V of FIG. 4.

FIG. 4 is a plan view of the injection hole formation member of the fuel injection device according to the embodiment (first embodiment) of the present invention, when viewed from an apical direction. FIG. 5 is an enlarged view of the vicinity of injection holes of the injection hole formation member according to the embodiment (first embodiment) of the present invention and is an enlarged plan view of a portion V of FIG. 4.

As shown in FIG. 4, the plurality of injection holes 119 are formed in a tip surface 116b of the injection hole formation member 116. In this embodiment, the six injection holes 119 are formed. That is, the six injection holes 119 include injection holes 501 to 506 shown in FIG. 5. Counterbore portions 511 to 516 are formed in outlet portions of the injection holes 501 to 506. The counterbore portions 511 to 516 are recessed portions formed in the tip surface of the injection hole formation member 116 and outlet surfaces of the injection holes 501 to 506 are opened in bottom surfaces of the recessed portions 511 to 516.

The injection hole 501 is an injection hole to inject the spray D1 and the injection hole 504 is an injection hole to inject the spray D4. The injection hole 501 and the injection hole 504 are arranged on the virtual plane 220b described above. That is, a center axis of the injection hole 501 and a center axis of the injection hole 504 are parallel on the virtual plane 220b and exist on the virtual plane 220b.

The injection hole 502 is an injection hole to inject the spray D2 and the injection hole 503 is an injection hole to inject the spray D3. The injection hole 502 and the injection hole 503 are arranged plane-symmetrically with respect to the virtual plane 220b. In addition, the injection hole 502 and the injection hole 503 are injection holes arranged closest to the injection hole 501.

The injection hole 505 is an injection hole to inject the spray D5 and the injection hole 506 is an injection hole to inject the spray D6. The injection hole 505 and the injection hole 506 are arranged plane-symmetrically with respect to the virtual plane 220b. In addition, the injection hole 505 and the injection hole 506 are injection holes arranged closest to the injection hole 504.

Figure 6:
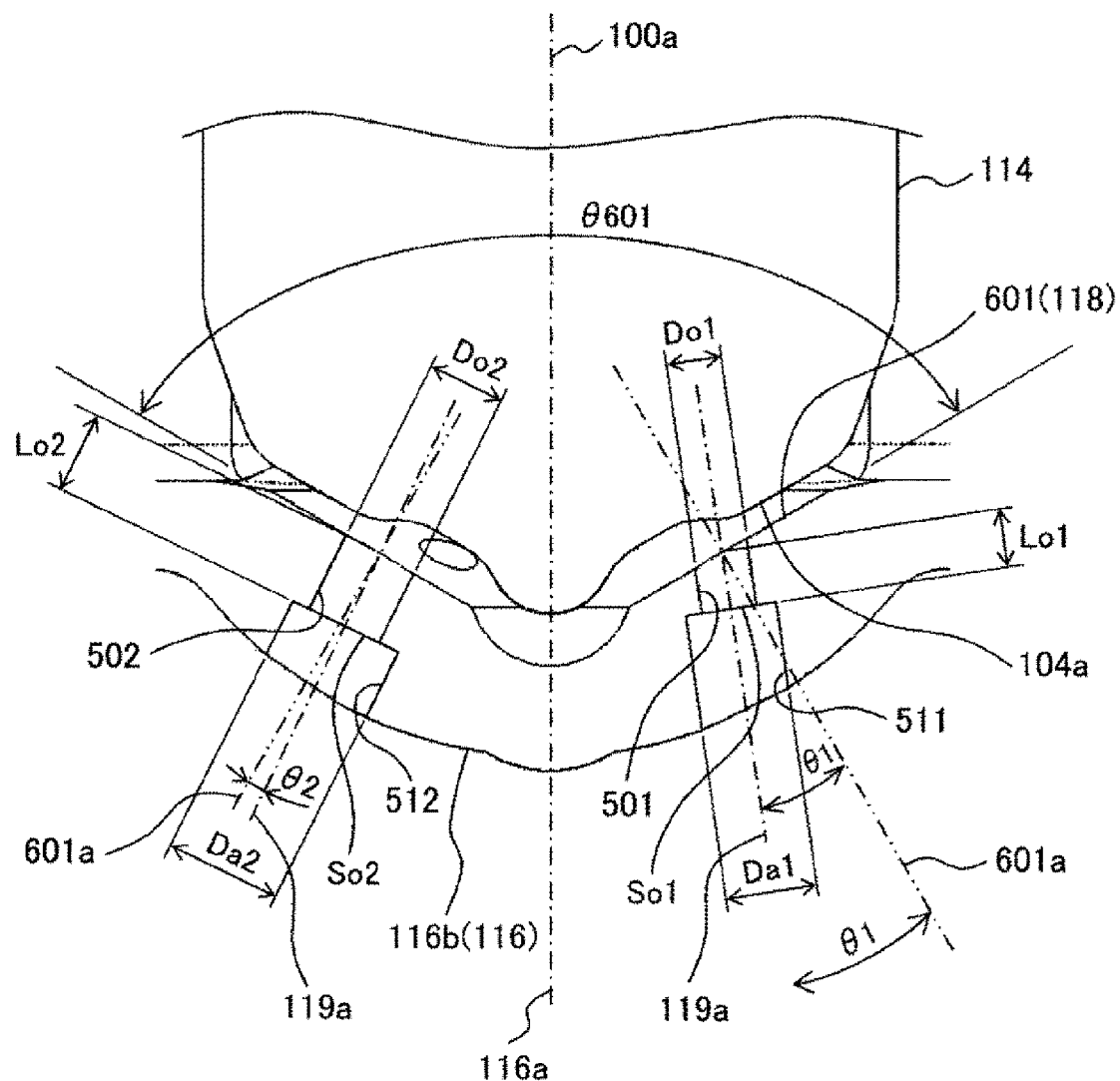
FIG. 6 is a diagram showing the injection hole formation member according to the embodiment (first embodiment) of the present invention and is a cross-sectional view showing a cross-section taken along VI-VI of FIG. 5.

FIG. 6 is a diagram showing the injection hole formation member according to the embodiment (first embodiment) of the present invention and is a cross-sectional view showing a cross-section taken along VI-VI of FIG. 5.

A seat surface 601 that forms the valve seat 118 contacting the valve body 114 and sealing the fuel has a substantially conical shape and contacts a spherical portion 104a of the valve body 114 to seal the fuel. The injection holes 119 include the plurality of injection holes 501 to 506 to form the sprays D1 to D6. The counterbore portions 511 to 516 that have inner diameters larger than diameters of the injection holes are formed in the tip portions of the injection holes 501 to 506, respectively.

The fuel injection device 100 in this embodiment has the first injection hole 501 and the two second injection holes 502 and 503 sandwiching the first injection hole 501, in the plurality of injection holes 501 to 506.

An inclination angle of the injection hole with respect to a normal (normal direction) 601a of the seat surface 601 (hereinafter, referred to as the injection hole angle θ) is larger in the first injection hole 501 than in the second injection holes 502 and 503. That is, there is a relation of θ1>θ2 between an injection hole angle θ1 of the first injection hole 501 and an injection hole angle θ2 of the second injection holes 502 and 503.

Here, the injection hole angle θ is an angle formed by the normal 601a and a center axis 119a of the injection hole and an inclination direction of the center axis 119a of the injection hole with respect to the normal 601a does not matter. That is, the inclination angle θ is an absolute value of the angle formed by the normal 601a and the center axis 119a of the injection hole.

In addition, the first injection hole 501 and the second injection holes 502 and 503 are configured such that a hole diameter (diameter of the injection hole) of each of the second injection holes 502 and 503 is larger than that of the first injection hole 501. That is, there is a relation of Do1<Do2 between a hole diameter Do1 of the first injection hole 501 and a hole diameter Do2 of each of the second injection holes 502 and 503.

Figure 7:
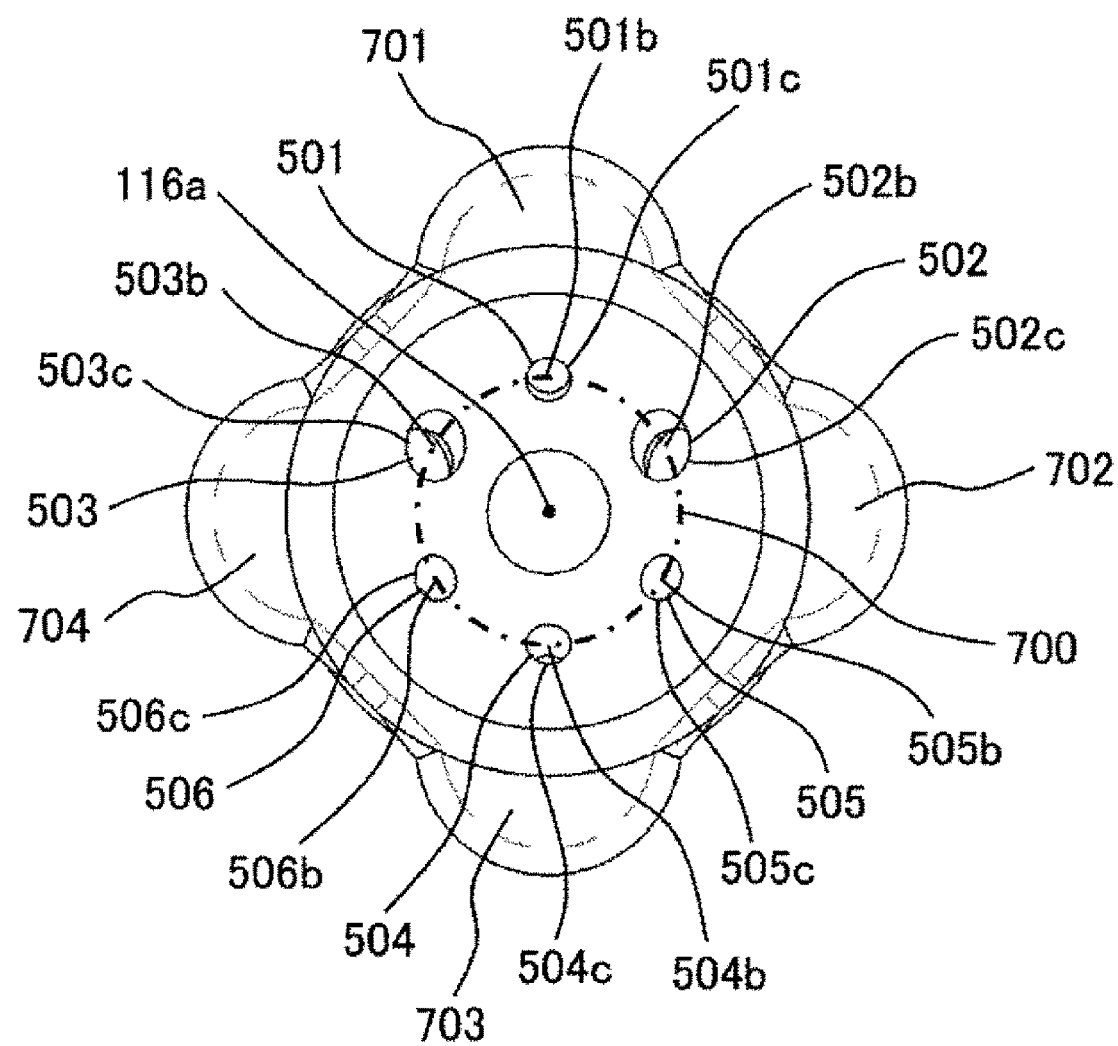
FIG. 7 is an enlarged plan view of the injection hole formation member according to the embodiment (first embodiment) of the present invention when viewed from the inner side (valve body side).

FIG. 7 is an enlarged plan view of the injection hole formation member according to the embodiment (first embodiment) of the present invention when viewed from the inner side (valve body side).

In this embodiment, the first injection hole 501, the second injection holes 502 and 503, and the other injection holes 504 to 506 are arranged on the same circumference 700 with the center axis 116a of the injection hole formation member 116 (the center axis of the valve body 114 or the center axis 100a of the fuel injection device 100) as the center. That is, centers 501b to 506b of inlet openings 501c to 506c of the injection holes 501 to 506 are arranged on the circumference 700. The centers 501b to 506b of the inlet openings 501c to 506c are matched with intersections of the center axes 119a of the injection holes 501 to 506 and the seat surface 601.

The fuel injection device 100 is configured to include the first injection hole 501 having a small hole diameter and the plurality of second injection holes 502 and 503 having a large hole diameter in the plurality of injection holes 501 to 506 and the first injection hole 501 and the second injection holes 502 and 503 are alternately arranged on the circumference 700. That is, the second injection holes 502 and 503 are arranged to be adjacent to the first injection hole 501 on the circumference 700. At this time, there is a relation of the inclination angles θ1 and θ2 between the first injection hole 501 and the second injection holes 502 and 503. As a result, the second injection holes 502 and 503 arranged closest to the first injection hole 501 have a configuration in which a hole diameter is large and an inclination angle is small, with respect to the first injection hole 501. In this embodiment, although the configuration having the two second injection holes 502 and 503 is described, a configuration having either the injection hole 502 or the injection hole 503 as the second injection hole may be used.

A plurality of fuel passages 701, 702, 703, and 704 arranged to be separated from each other in a circumferential direction with the center axis 116a as the center are formed in the injection hole formation member 116. The fuel passages 701 to 704 configure flow passages to guide the fuel to the injection holes 501 to 506.

Figure 8:
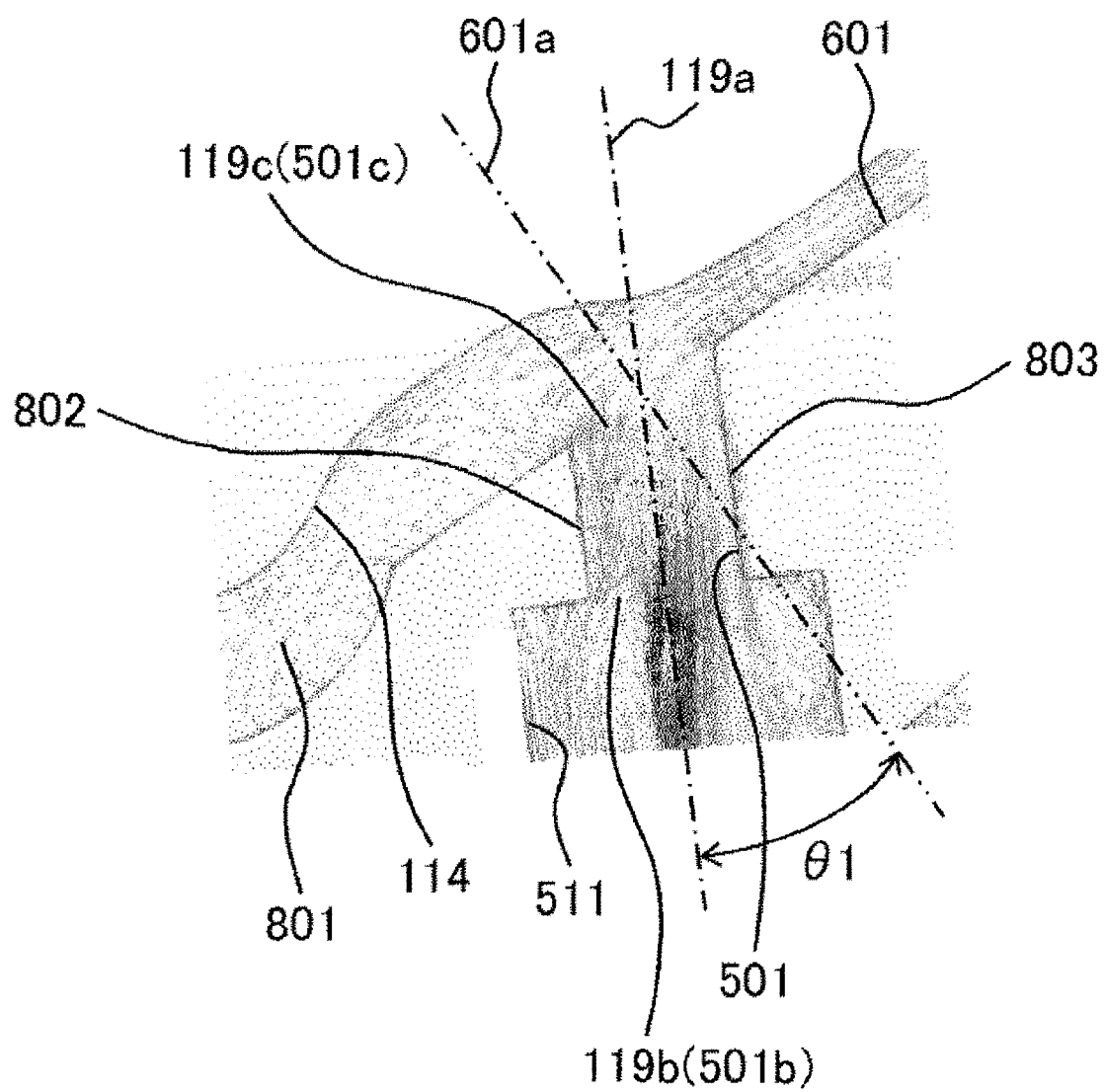
FIG. 8 is a diagram showing a flow rate distribution (flow rate vector) of fuel flowing into the injection holes formed in the injection hole formation member.

Here, a relation of the injection hole diameter (diameter of the injection hole) and the penetration of the fuel spray will be described using FIG. 8. FIG. 8 is a diagram showing a flow rate distribution (flow rate vector) of the fuel flowing into the injection holes formed in the injection hole formation member.

FIG. 8 shows the flow rate distribution when the hole diameter of each of the other injection holes 502 and 503 is set to be about the same as the hole diameter of the first injection hole 501 shown in FIGS. 5 and 6. In this case, the injection hole angle θ1 formed by the normal 601a of the seat surface 601 and the center axis 119a of the injection hole is still larger than the injection hole angles of the other injection holes 502 to 506. In this case, the fuel is separated at an inlet 119c (501c) of the injection hole 501 and the fuel in the injection hole 501 flows to be biased toward a surface opposite to the separation side. Particularly, in FIG. 8, the fuel flowing from a volume 801 formed in the tip portion of the valve body 114 is separated from an injection hole wall surface 802 at an inlet 119c of the injection hole 501 and the fuel flowing through the injection hole 501 flows to be biased toward the side of a wall surface 803 of the seat (portion contacting the valve body 114) side. For this reason, the flow rate distribution of the fuel spray at the injection hole outlet 119b (501b) does not become uniform and a maximum value of a rate vector in a direction along the center axis 119a in the injection hole outlet 119b increases.

When the injection hole is not filled with the fuel due to the separation of the fuel, the inner diameter of the injection hole is substantially reduced. Therefore, if a flow volume per unit time in the fuel injected from the injection hole is Qo, a flow rate of the fuel injected from the injection hole is vo, and a cross-sectional area of the injection hole is Do, the flow rate vo is calculated by a relation of a formula (1).

$$vo = Qo/Do \quad (1)$$

According to the formula (1), if the injection hole diameter Do decreases, the flow rate vo increases. As a result, because the penetration force of the spray increases, a travel distance (penetration) of the fuel spray increases. The penetration increases, so that fuel adhesion to the cylinder inner wall surface 210 in the cylinder 220, the piston 209, and the exhaust valve 211 increases. Because the fuel adhered to the cylinder inner wall surface 210 or the piston 209 is difficult to vaporize, PN may increase.

Particularly, because the injection hole angle θ1 of the injection hole 501 is large as described above, the fuel spray injected from the injection hole 501 has problems in that the penetration easily increases and the fuel spray easily adheres to the cylinder inner wall surface 210.

Figure 9:
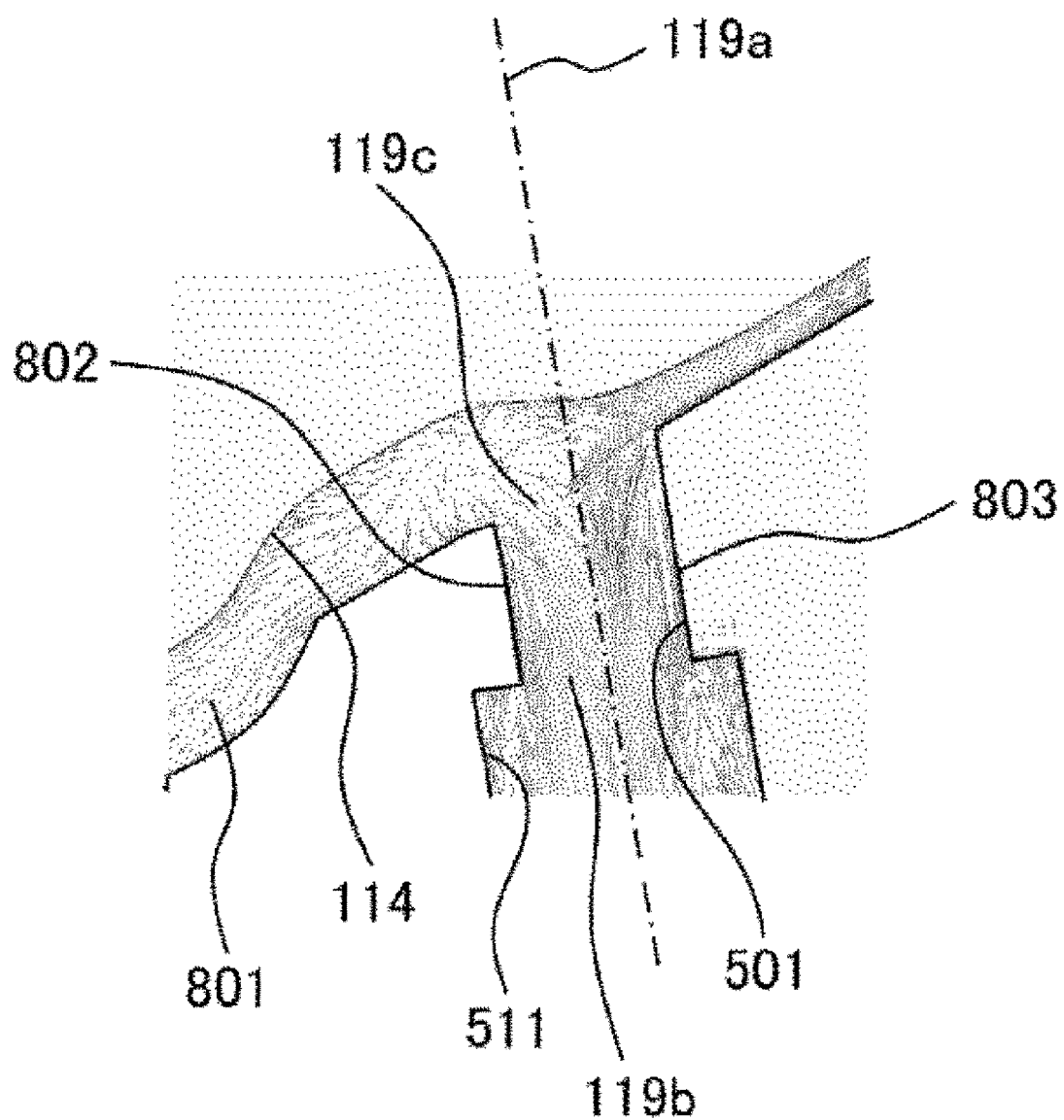
FIG. 9 is a diagram showing a flow rate distribution (flow rate vector) of fuel flowing into a first injection hole formed in the injection hole formation member according to the embodiment (first embodiment) of the present invention.

FIG. 9 is a view showing a flow rate distribution (flow rate vector) of the fuel flowing into the first injection hole formed in the injection hole formation member according to the embodiment (first embodiment) of the present invention.

In this embodiment, the hole diameter Do2 of each of the second injection holes 502 and 503 is set to be larger than the hole diameter Do1 of the first injection hole 501, so that a ratio of the fuel injected from the injection holes 502 and 503 can be increased, and an amount of fuel injected from the injection hole 801 decreases relatively.

As shown in FIG. 9, when an amount of fuel flowing through the first injection hole 501 decreases, the flow rate of the fuel in the first injection hole 501 decreases. For this reason, the separation of the fuel in the injection hole inlet 119c decreases and the fuel flows along injection hole wall surfaces 802 and 803 over the entire circumference of the injection holes. Therefore, the separation is small and the fuel can flow through the entire cross-section (cross-section perpendicular to the center axis 119a) of the injection hole 501. Therefore, the substantial hole diameter Do increases and the flow rate Vo decreases.

In addition, the flow rate distribution at the outlet 119b of the injection hole 501 is equalized, so that a maximum value of the flow rate vector decreases. Therefore, the penetration force of the spray can be reduced and the penetration is decreased. As a result, adhesion of the fuel to the inner surface of the cylinder inner wall 210 can be reduced and PN can be suppressed.

By increasing the ratio of fuel flowing into the second injection holes 502 and 503 as compared with the first injection hole 501, the penetration force of the sprays D2 and D3 of the second injection holes 502 and 503 can be strengthened and the penetration of the sprays D2 and D3 can be increased. Because the sprays D2 and D3 oriented in the direction of the intake valves 205*a* and 205*b* are close to the intake valves 205*a* and 205*b*, the sprays are easily affected by the flow of the incoming air. By securing the penetration force of the sprays D2 and D3 and increasing the penetration, even when the air flow is strong, the directivity of the sprays D2 and D3 can be secured and the degree of homogeneity of the air-fuel mixture can be improved. As a result, effects of improvement of combustion efficiency and PN reduction are obtained.

As compared with the case of steady running with a constant engine speed, in a transient state in which a vehicle accelerates or decelerates, the air flow is strong and the spray is affected by the air flow, so that the degree of homogeneity of the air-fuel mixture may decrease. In the fuel injection device 100 in this embodiment, the penetration force of the sprays D2 and D3 is increased even in the transient state, so that the degree of homogeneity of the air-fuel mixture can be improved, and the PN reduction effect can be heightened.

In addition, the fuel injection device 100 in this embodiment is configured such that the penetration of the sprays D2 and D3 oriented to the intake valves 205*a* and 205*b* is longest as compared with the other sprays and the penetration of the spray D1 oriented in the direction of the ignition plug 203 is shorter than those of the sprays D2 and D3. By applying the fuel injection device 100 to the direct injection engine including the intake valve 205, the ignition plug 203, the piston 209, and the cylinder 229, the PN reduction effect can be heightened.

When an angle θ601 (refer to FIG. 6) formed by the seat decreases, the injection hole angle θ of the injection hole 801 increases. Therefore, the configuration in the first embodiment of the present invention is effective when the angle θ601 is in a range of 150 degrees or less.

When Lo/Do to be a ratio of the length Lo of the injection hole to the hole diameter Do of the injection hole is large, that is, when the length Lo of the injection hole is long or the hole diameter Do of the injection hole is small, the fuel is rectified in the injection hole and is injected from the injection hole outlet. For this reason, the flow rate vector in the direction along the center axis 119*a* of the injection hole increases and the penetration is lengthened. On the other hand, when Lo/Do is small, the fuel is injected from the injection hole outlet before the flow of the fuel is rectified in the injection hole. For this reason, the flow rate vector in the direction along the center axis 119*a* of the injection hole can be decreased and the penetration can be shortened.

Therefore, Lo1/Do1 of the first injection hole 501 is configured to be smaller than Lo2/Do2 of the second injection holes 502 and 503 (refer to FIG. 6). As a result, the penetration of the first spray D1 is shortened and the fuel adhesion to the cylinder inner wall surface 210 is suppressed, so that the PN reduction effect can be heightened. As a mechanism for reducing Lo/Do, there is a method of decreasing Lo1 of the first injection hole 501 by increasing the depth of the counterbore portion 511 or increasing the hole diameter Do1 of the first injection hole 501. However, when the hole diameter Do1 of the first injection hole 501 is increased, the amount of fuel flowing through the first injection hole 501 also increases. For this reason, to reduce the penetration, it is effective to increase the depth of the counterbore portion 511 in particular.

To suppress the maximum value of the flow rate vector in the direction along the center axis 119*a* in the injection hole outlet, a cross-sectional shape of each of the injection holes 501 to 506 may be a shape other than a circular shape (perfect circle), for example, an elliptical shape. When the cross-sectional shape of the injection hole is a shape other than the perfect circle, the hole diameter Do1 of the first injection hole 501 cannot be compared with the hole diameter Do2 of each of the second injection holes 502 and 503. Therefore, when the cross-sectional shape of the injection hole is the shape other than the perfect circle, the shapes of the injection holes 501, 502, and 503 may be determined such that a cross-sectional area So1 of the first injection hole 501 is smaller than a cross-sectional area So2 of each of the second injection holes 502 and 503. The cross-sectional areas So1 and So2 are areas of cross-sections of injection holes perpendicular to the center axis 119*a* of each injection hole. By adopting this configuration, an effect of shortening the penetration of the spray D1 in the first injection hole 501 can be obtained.

The counterbore portions 511 to 516 that have inner diameters larger than the hole diameters of the injection holes 501 to 506 are configured at the downstream sides of the injection holes 501 to 506, respectively. By providing the counterbore portions 511 to 516, it is possible to reduce the length Lo of the injection hole while securing the thickness of the injection hole formation member 116, so that it is possible to realize both securing of the withstand pressure by the fuel pressure and penetration reduction. By providing the counterbore portions 511 to 516, it is possible to reduce an influence of the air flow in the engine or the pressure change on the spray and stably inject the fuel spray into the engine cylinder.

An inner diameter Da2 of each of the second counterbore portions 512 and 513 of the second injection holes 502 and 503 may be larger than an inner diameter Da1 of the first counterbore portion 511 of the first injection hole 501. Because the fuel injected from the first injection hole 501 has a swirling component in the radial direction with respect to the center axis 119*a* of the injection hole, as shown by the sprays D1 to D6 of FIGS. 2 and 3, the fuel spreads radially from the injection hole outlet and is injected. When the inner diameter of the counterbore portion is excessively larger than the hole diameter of the injection hole, an effect of cleaning a carbon deposition material (deposit) by the injected fuel decreases. For this reason, the generated deposit is deposited in the counterbore portion and the fuel permeates from the deposit portion, so that PN may increase.

In addition, when the inner diameter of the counterbore portion is excessively smaller than the hole diameter of the injection hole, the fuel injected from the injection hole collides with the counterbore portion and the penetration of the spray or a position of a center of gravity of the spray varies, so that the combustion becomes unstable or the degree of homogeneity of the air-fuel mixture may decrease and PN may increase. According to the configuration of the first embodiment of the present invention, the inner diameter Da1 of the first counterbore portion 511 of the first injection hole 501 is configured to be smaller than the inner diameter Da2 of each of the second counterbore portions 512 and 513 of the second injection holes 502 and 503 (Da1<Da2), so that it is possible to cause the inner diameter of the counterbore portion to be appropriate according to the injection hole diameter, the durability can be secured, and the PN reduction effect can be obtained.

In addition, when the shape of the counterbore portion is changed to a shape other than the circular shape (perfect circle) to reduce the deposit, the cross-sectional area of the first counterbore portion 511 is configured to be smaller than the cross-sectional area of each of the second counterbore portions 512 and 513, so that the PN reduction effect described above can be obtained.

Next, a flow of the fuel in the fuel injection device 100 will be described using FIGS. 1, 5, and 7.

The fuel flowing from the upstream side of the injection hole formation member 116 passes through the four fuel passages 701 to 704 provided in the injection hole formation member 116 and is injected from the injection holes 501 to 506. The positions 501b to 506b of the center axis 119a on the seat surface 601 in the injection holes 501 to 506 (that is, the positions of the center points of the inlet opening surfaces of the injection holes 501 to 506) are arranged such that parts of the inlet opening surfaces 501c to 506c of the injection holes 501 to 506 cover the circumference 700. More preferably, the center points 501b to 506b of the inlet opening surfaces 501c to 506c of the injection holes 501 to 506 may be arranged on the same circumference. By arranging the injection holes 501 to 506 on the same circumference, the fuel flowing from the upstream side flows uniformly into the injection holes 501 to 506, so that the fuel easily flows into the injection holes 501 to 506. That is, the above-described arrangement of the injection holes 501 to 506 has an effect of equalizing the ratio (fuel flow volume distribution) of the fuel flowing into the injection holes 501 to 506.

In this embodiment, by arranging the injection holes 501 to 506 to equalize the flow volume distribution of the injection holes 501 to 506 and then changing the hole diameter of the first injection hole 501 and the hole diameters of the second injection holes 502 and 503, the flow volume distribution of the first injection hole 501 and the second injection holes 502 and 503 is changed. As a result, it is possible to surely and accurately change the flow volume distribution of the first injection hole 501 and the second injection holes 502 and 503 and it is possible to surely and accurately change the penetration of the fuel spray injected from the first injection hole 501 and the second injection holes 502 and 503.

In the configuration of the first embodiment described in FIG. 5, the injection hole angle θ1 of the first injection hole 501 is larger than the injection hole angle θ (injection hole angles θ502 to θ506 of the injection holes 502 to 506) other than the injection hole 501 and is largest among the injection holes 501 to 506. However, the first injection hole 501 may have a configuration in which the injection hole angle θ is larger than those of the adjacent second injection holes 502 and 503 and there may be an injection hole having the injection hole angle θ larger than the injection hole angle θ1 of the first injection hole 501 in the injection holes 504 to 506. That is, the magnitude relation of the injection hole angles θ may be set as described above, between the first injection hole and the injection holes capable of changing the flow volume distribution of the first injection hole 501. In this case, the injection holes affecting the flow volume distribution of the first injection hole 501 are the second injection holes 502 and 503 adjacent to the first injection hole 501. In this embodiment, the diameter of the injection hole having the large injection hole angle θ between the adjacent injection holes is reduced, so that the effect of shortening the penetration can be obtained.

To improve fuel efficiency, in the case where the attachment position of the fuel injection device 100 is a position near the ignition plug for weak stratified combustion, that is, the case of being arranged immediately above, a relation of the injection hole angles θ of the injection holes 501 to 506 may be different from that in the configuration of FIG. 2.

According to the configuration in this embodiment, the injection hole angles θ are compared between the adjacent injection holes and the small injection hole diameter is set in the case of the small injection hole angle θ, so that the penetration can be surely shortened without depending on the attachment position of the fuel injection device 100. In the case of being arranged immediately above, the penetration of the injection hole of the spray oriented in the piston direction in particular is shortened, so that the fuel adhesion to the piston 209 can be suppressed, and the PN reduction effect can be heightened.

In particular, under the conditions where the engine speed is small and the air flow volume in the engine cylinder is small, the fuel spray is difficult to mix with air. For this reason, the penetration is lengthened, so that the fuel adhesion to the cylinder inner wall surface 210 increases, and PN increases. In addition, under the conditions of fast idling where the engine is started from the cold state, the temperature in the engine cylinder is low. For this reason, the adhered fuel is difficult to vaporize and when the penetration is lengthened, PN easily increases.

According to the fuel injection device 100 in the first embodiment of the present invention, it is possible to suppress the fuel adhesion to the cylinder inner wall surface by the reduction in the penetration even under the operating conditions of the engine in which PN easily increases as described above. Therefore, PN can be reduced.

The fuel injection device according to this embodiment may be attached to the engine such that the first injection hole 501 injects the spray D4 oriented to the side of the piston 209. As a result, the penetration of the spray D4 oriented to the side of the piston 209 can be shortened and the fuel adhesion to the piston 209 can be suppressed. As a result, PN can be reduced.

Second Embodiment

A second embodiment of the present invention will be described using FIGS. 10 to 12. In this embodiment, for the same components and configurations as those in the first embodiment, the same reference numerals are used.

Figure 10:
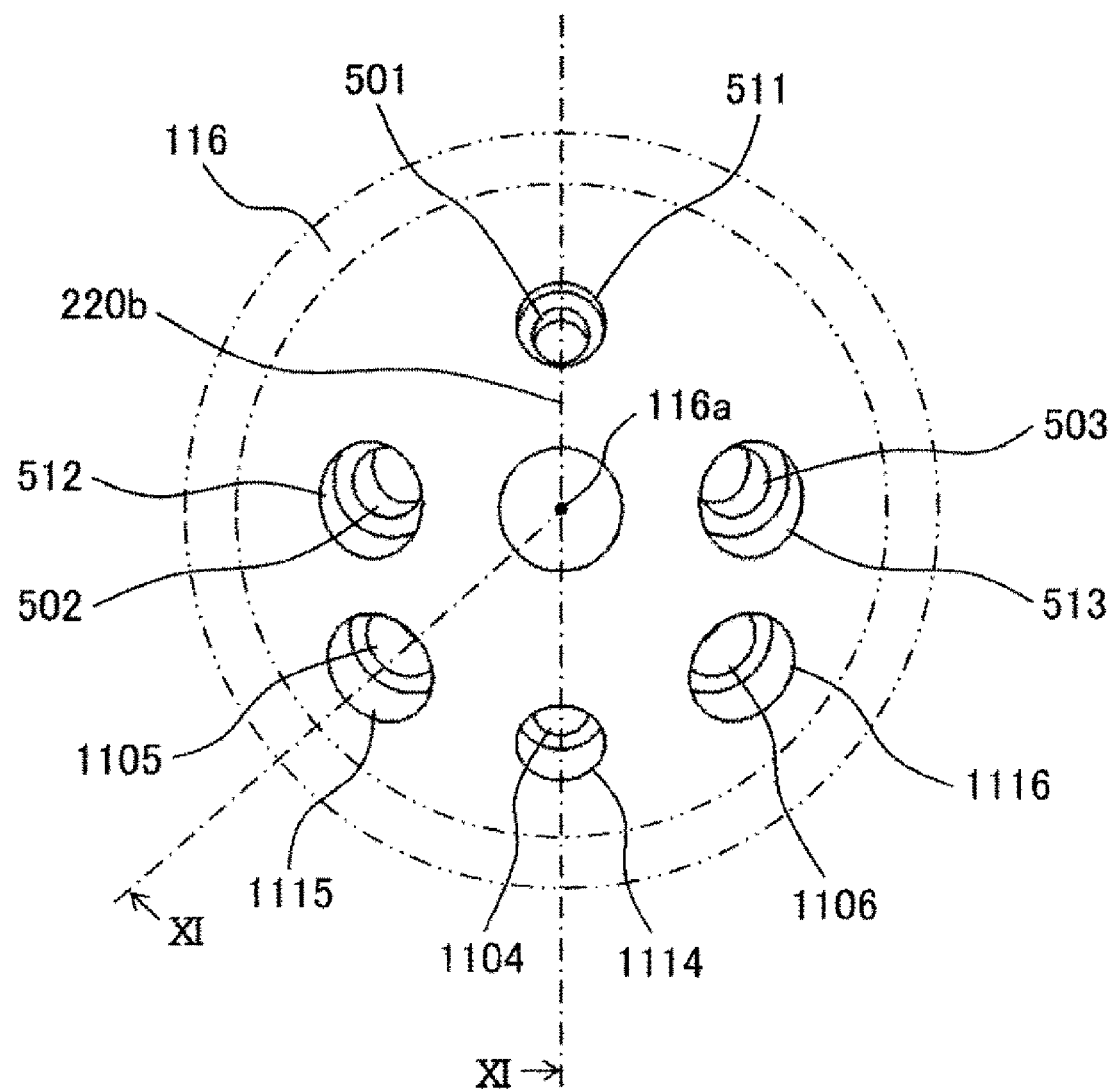
FIG. 10 is a plan view of an injection hole formation member of a fuel injection device according to an embodiment (second embodiment) of the present invention, when viewed from an apical direction.
Figure 11:
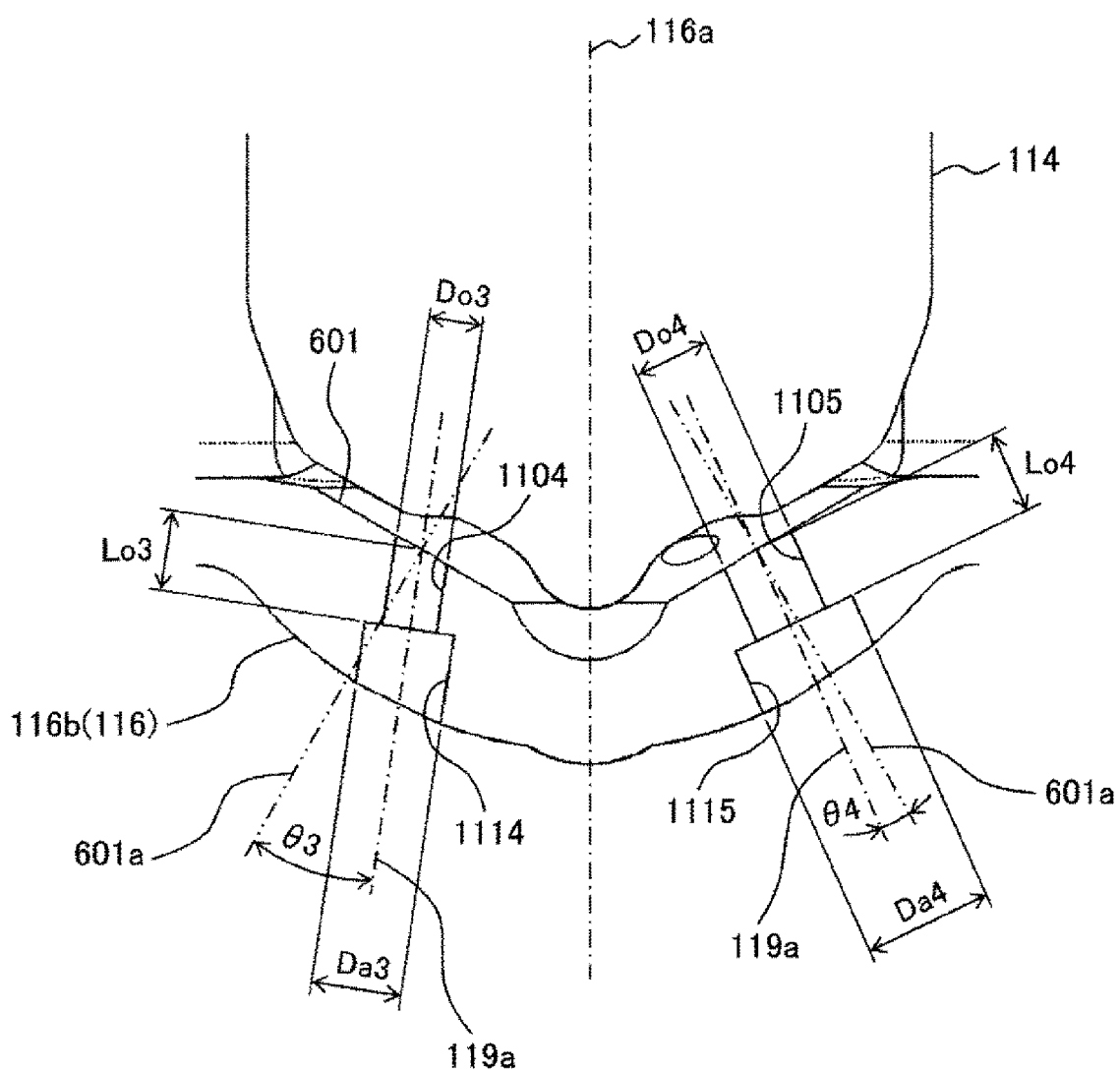
FIG. 11 is a diagram showing the injection hole formation member according to the embodiment (second embodiment) of the present invention and is a cross-sectional view showing a cross-section taken along XI-XI of FIG. 10.

FIG. 10 is a plan view of an injection hole formation member of a fuel injection device according to an embodiment (second embodiment) of the present invention, when viewed from an apical direction. FIG. 11 is a diagram showing the injection hole formation member according to the embodiment (second embodiment) of the present invention and is a cross-sectional view showing a cross-section taken along XI-XI of FIG. 10.

This embodiment is applied to the same fuel injection device 100 as that in FIG. 1 showing the first embodiment. This embodiment is different from the first embodiment in that a third injection hole 1104 different from a first injection hole 501 and two fourth injection holes 1105 and 1106 sandwiching the third injection hole 1104 are provided and a hole diameter Do4 of each of the fourth injection holes 1105 and 1106 is larger than a hole diameter Do3 of the third injection hole 1104. In the fuel injection device 100 according to the second embodiment, the first injection hole 501, second injection holes 502 and 503, the third injection hole 1104, and the fourth injection holes 1105 and 1106 are arranged such that individual inlet opening surfaces cover the same circumference.

In this embodiment, a plurality of injection holes formed in an injection hole formation member 116 are configured such that the third injection hole 1104 corresponds to the first injection hole 501 and the fourth injection holes 1105 and 1106 correspond to the second injection holes 502 and 503. That is, the third injection hole 1104 and the fourth injection holes 1105 and 1106 have configurations and a relation of the first injection hole 501 and the second injection holes 502 and 503 described in the first embodiment.

Therefore, an injection hole angle θ3 of the third injection hole 1104 and an injection hole angle θ4 of the fourth injection holes 1105 and 1106 have the same relation as a relation of an injection hole angle θ1 and an injection hole angle θ2 described in the first embodiment. An injection hole length Lo3 of the third injection hole 1104 and an injection hole length Lo4 of the fourth injection holes 1105 and 1106 have the same relation as a relation of an injection hole length Lo1 and an injection hole length Lo2 described in the first embodiment.

An inner diameter Da3 of a counterbore portion 1114 of the third injection hole 1104 and an inner diameter Da4 of each of counterbore portions 1115 and 1116 of the fourth injection holes 1105 and 1106 have the same relation as a relation of an inner diameter Da1 of a counterbore portion 511 and an inner diameter Da2 of each of counterbore portions 512 and 513 described in the first embodiment.

The fuel injection device 100 is configured to include the third injection hole 1104 having a small injection hole diameter and the plurality of fourth injection holes 1105 and 1106 having a large injection hole diameter in the plurality of injection holes 501 to 503 and 1104 to 1106 and the third injection hole 1104 and the fourth injection holes 1105 and 1106 are alternately arranged on the same circumference.

Figure 12:
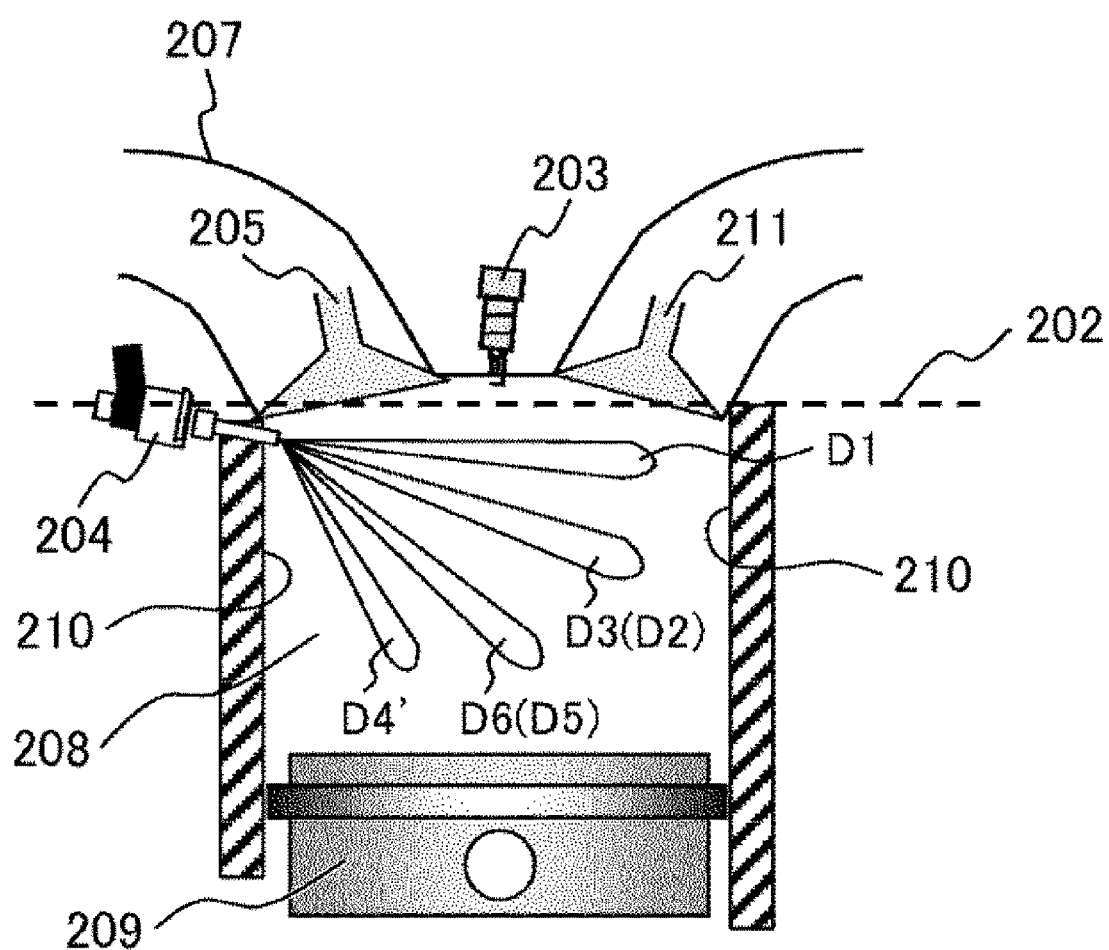
FIG. 12 is a schematic diagram of a cylinder direct injection type internal combustion engine (direct injection engine) that directly injects fuel into a cylinder in accordance with the embodiment (second embodiment) of the present invention.

FIG. 12 is a schematic diagram of a cylinder direct injection type internal combustion engine (direct injection engine) that directly injects fuel into a cylinder in accordance with the embodiment (second embodiment) of the present invention.

Due to a geometrical configuration, a spray D4' oriented to the side of a piston 209 has a shorter distance to the piston 209 than sprays D5 and D6 oriented in a diagonal direction of the piston 209. Therefore, a ratio of adhesion to the piston 209 is larger in the spray D4' than in the sprays D5 and D6.

By configuring the hole diameter of each of the fourth injection holes 1105 and 1106 to be larger than that of the third injection hole 1104, a ratio of fuel flowing through the fourth injection holes 1105 and 1106 can be increased and a ratio of the fuel flowing through the third injection hole 1104 can be decreased. As a result, because a flow rate of the fuel in the third injection hole 1104 decreases, separation of the fuel in an injection hole inlet of the third injection hole 1104 decreases and the fuel flows along a wall surface (refer to 802 of FIG. 9) of the third injection hole 1104 and is injected from an injection hole outlet (refer to 119b of FIG. 9). Because the separation of the fuel is small, the fuel flows throughout the injection hole 1104, so that a substantial injection hole diameter Do increases and a flow rate Vo in the injection hole outlet decreases according to the formula (1). Therefore, because the penetration force of the spray is decreased, and penetration is shortened. As a result, adhesion of the fuel to the piston 209 can be reduced and PN can be suppressed.

In addition, the third injection hole 1104 may be configured on the side opposite to the first injection hole 501 with the injection hole formation member 116 or a center axis of a valve body 114 therebetween. By forming sprays symmetrical to a virtual plane 220b passing through the first injection hole 501 and the third injection hole 1104, it is possible to uniformly inject the fuel sprays into an entire inner portion of an engine cylinder. Therefore, a degree of homogeneity of an air-fuel mixture can be improved and PN can be suppressed.

Particularly, in a cylinder direct injection engine in which the fuel is directly injected into the cylinder, to suppress a temperature in the cylinder or improve the degree of homogeneity of the air-fuel mixture, the fuel may be injected at the timing of an upward stroke (compression stroke) of the piston 209 or timing just before ignition in an ignition plug 203. A distance between the fuel injection device 100 and the piston 209 becomes shorter when a position of the piston 209 becomes closer to a top dead center. For this reason, the injected fuel spray easily adheres to the piston 209 and PN easily increases. According to the fuel injection device 100 according to the second embodiment, because the penetration of the fourth spray D4' can be shortened, it is particularly effective for the direct injection engine that injects fuel after the compression stroke. As a result, it is possible to realize both improvement of fuel efficiency and PN reduction by suppressing the combustion temperature.

In addition, the hole diameters of the fourth injection holes 1105 and 1106 may be smaller than the hole diameters of the second injection holes 502 and 503. A spray D2 and a spray D3 diagonally injected toward intake valves 205a and 205b or a cylinder inner wall surface 210 have a longer distance from the outlet of the injection hole to the cylinder inner wall surface 210 than the spray D1. For this reason, an amount of fuel sprays adhering to the cylinder inner wall surface 210 is small. Therefore, the hole diameters of the second injection holes 502 and 503 are configured to be larger than the hole diameters of the fourth injection holes 1105 and 1106, so that a ratio of fuel flowing through the second injection holes 502 and 503 is increased, and a ratio of the fuel flowing through the fourth injection holes 1105 and 1106 can be decreased. As a result, the penetration of the sprays D3 and D4 of the fourth injection holes 1105 and 1106 can be shortened and the fuel adhesion to the piston 209 can be further suppressed to heighten a PN reduction effect.

Even when the first injection hole 501 and the second injection holes 502 and 503 are not included, the configuration of each of the third injection hole 1104 and the fourth injection holes 1105 and 1106 according to the second embodiment can obtain an effect of suppressing the fuel adhesion to the piston 209 by a single configuration. Particularly, in an engine having a large displacement, for example, 2.4 L or more, because the inner diameter of the cylinder is large, the distance between the fuel injection device 100 and the cylinder inner wall surface 210 facing the fuel injection device 100 becomes long. As a result, because the fuel adhesion to the cylinder inner wall surface 210 can be relatively reduced, the configurations of the third injection hole 1104 and the fourth injection holes 1105 and 1106 according to the second embodiment may be applied without adopting the configurations of the first injection hole 501 and the second injection holes 502 and 503.

Similar to the first embodiment, the first injection hole 501 is configured to have smaller Lo/Do than the second injection holes 502 and 503, so that the penetration of the first spray D1 can be shortened, and the fuel adhesion to the cylinder inner wall surface 210 can be suppressed to heighten a PN reduction effect. In addition, the third injection hole 1104 is configured to have smaller Lo/Do than the fourth injection holes 1105 and 1106, so that the fuel adhesion to the piston 209 can be suppressed, and PN can be reduced.

In addition, the fourth injection holes 1105 and 1106 may be configured to have smaller Lo/Do than the second injection holes 502 and 503. As described in the first embodiment, the sprays D2 and D6 oriented to the vicinity of the side of the intake valves 205a and 205b have smaller sensitivity to PN when the penetration becomes longer than the other sprays. Therefore, the fourth injection holes 1105 and 1106 are configured to have smaller Lo/Do than the second injection holes 502 and 503, so that the penetration of the sprays D3 and D5 oriented in a diagonal direction of the piston 209 can be suppressed, and PN can be reduced.

In addition, the configuration in the second embodiment is effective for a spray guide type direct injection engine in a method of forming the air-fuel mixture using air flow. In the spray guide type, the engine is a direct injection engine that reduces PN by not adhering the fuel injected into the piston 209. By shortening the penetration of the fourth spray D4', fuel adhesion to the piston 209 can be suppressed and PN can be reduced.

As one of methods of forming the air-fuel mixture of the direct injection engine, there is an air guide method that forms the air-fuel mixture using the flow of the cylinder. In the air guide method, the air-fuel mixture is formed in the vicinity of the ignition plug 203 by using the flow of air flowing from the valve 205 without causing the spray to collide with the piston 209. In the air guide method, the fuel adhesion to the piston 209 is small and PN can be suppressed. In addition, in a shape of an upper end face (crest surface) 213 of the piston 209 in the air guide method, a center portion 213a of the piston 209 may have a flat shape as shown in FIG. 2. By forming the center portion 213a to have the flat shape, it is difficult for the fuel spray to adhere to the piston 209, a homogeneous air-fuel mixture can be formed by using the air flow, and PN can be reduced. According to the configuration of the second embodiment, because the penetration of the fuel spray D4' in the injection hole 1104 oriented in the direction of the piston 209 can be suppressed, the fuel adhesion to the piston 209 can be reduced. For the above reasons, the configuration of the second embodiment may be used for the direct injection engine adopting the air guide method.

To improve the degree of homogeneity of the air-fuel mixture, multi-stage injection in which the fuel sprays during one combustion cycle are divided into a plurality of parts to promote mixing of the fuel and the air may be performed. In the multi-stage injection, the fuel may be injected during the compression stroke of the piston 209. However, because the distance between the fuel injection device 100 and the piston 209 is short, the fuel spray D4' easily adheres to the piston 209. When the multi-stage injection is performed, the fuel adhesion to the piston 209 can be suppressed by suppressing the penetration of the fuel spray D4' and PN can be further suppressed by realizing both it and improvement of the degree of homogeneity of the air-fuel mixture.

In addition, in the configuration in the second embodiment, the penetration of the sprays D2 and D3 oriented to the intake valves 205a and 205b is longest as compared with the other sprays and the penetrations of the spray D1 oriented in the direction of the ignition plug 203 and the spray D4' oriented in the direction of the piston 209 are shorter than those of the sprays D2 and D3. By configuring the direct injection engine using the fuel injection device 100, the intake valves 205a and 205b, the ignition plug 203, the piston 209, and the cylinder 229, the PN reduction effect can be heightened.

Even in this embodiment, the cross-sectional shape of each of the injection holes 501 to 503 and 1104 to 1106 may be a shape other than a circular shape (perfect circle), for example, an elliptical shape. When the cross-sectional shape of the injection hole is the shape other than the perfect circle, the shapes of the injection holes 501 to 503 and 1104 to 1106 may be determined such that a cross-sectional area of the injection hole instead of the injection hole diameter satisfies the relation described above.

Third Embodiment

A third embodiment of the present invention will be described using FIG. 13. In this embodiment, for the same components and configurations as those in the other embodiments, the same reference numerals as those in the other embodiments are used.

Figure 13:
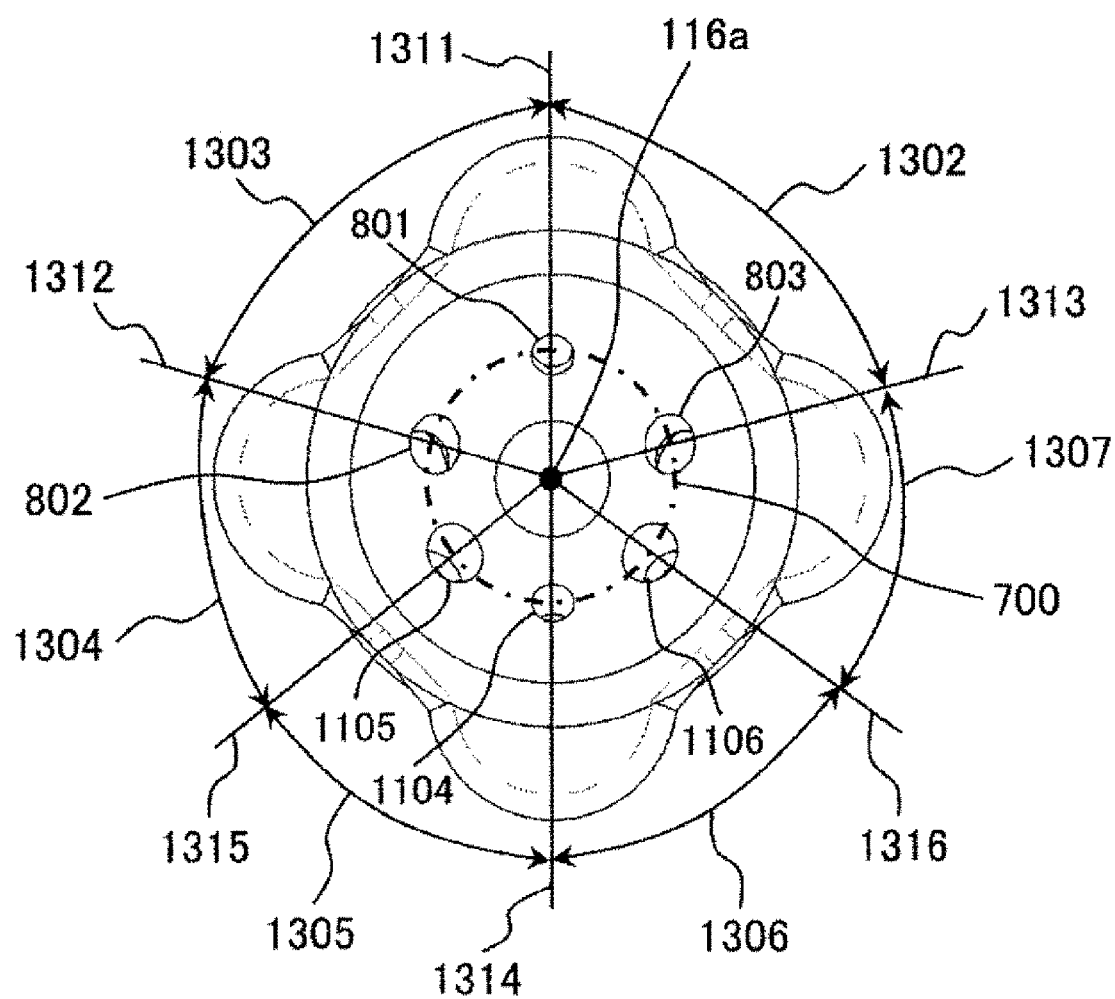
FIG. 13 is an enlarged plan view of an injection hole formation member according to an embodiment (third embodiment) of the present invention when viewed from the inner side (valve body side).

FIG. 13 is an enlarged plan view of an injection hole formation member according to an embodiment (third embodiment) of the present invention when viewed from the inner side (valve body side). In FIG. 13, description of a valve body 114 is omitted to explain an arrangement of injection holes.

FIG. 13 is a plan view in which a seat surface 601, a center axis 116a of an injection hole formation member 116, and injection holes 801 to 803 and 1104 to 1106 are projected on a plane perpendicular to the center axis 116a of the injection hole formation member 116 and a center axis 100a of a fuel injection device 100.

The third embodiment is different from the second embodiment in that injection hole centerlines connecting the center axis 116a of the injection hole formation member 116 and intersections (center positions of inlet opening surfaces of injection holes) of the seat surface 601 and center axes of the injection holes 801 to 803 and 1104 to 1106 are shown by reference numerals 1311 to 1316. In this embodiment, the center points of the inlet opening surfaces of the injection holes 801 to 803 and 1104 to 1106 are located on a circumference 700. The center points of the inlet opening surfaces of the injection holes 801 to 803 and 1104 to 1106 do not need to be located on the circumference 700. However, the injection holes 801 to 803 and 1104 to 1106 are preferably arranged such that the inlet opening surfaces of the injection holes 801 to 803 and 1104 to 1106 cover the circumference 700.

The center axis 116a of the injection hole formation member 116 is matched with the center axis of the seat surface 601 formed in a substantially conical shape and passes through the center of the seat surface 601.

When the injection hole centerlines 1311 to 1316 of the injection holes adjacent to each other are compared, injection hole centerline angles 1303 and 1302 formed by the injection hole centerline 1311 passing through the first injection hole 801 and the injection hole centerlines 1312 and 1313 of the second injection holes 802 and 803 are larger than injection hole centerline angles 1304, 1305, 1306, and 1307 formed by injection hole centerlines of the other injection holes adjacent to each other.

By this effect, because hole positions of the second injection holes 802 and 803 and the fourth injection holes 1105 and 1106 having larger hole diameters than the first injection hole 801 can be caused to be close to each other, a distance between the sprays becomes short and interference between the sprays becomes strong. As a result, an amount of air between the sprays decreases and it becomes difficult to receive shear resistance with air when the fuel is injected. Therefore, the penetrations of the sprays D5 and D6 in the fourth injection holes 1105 and 1106, the spray D4' in the third injection hole 1104, and the second injection holes 802 and 803 can be shortened (refer to FIG. 12), the fuel adhesion to the piston 209 or the cylinder inner wall surface 210 can be suppressed, and PN can be reduced. The configuration according to the third embodiment may be used in combination with the configuration according to the first embodiment.

Fourth Embodiment

A fourth embodiment of the present invention will be described using FIG. 14. In this embodiment, for the same components and configurations as those in the other embodiments, the same reference numerals as those in the other embodiments are used.

Figure 14:
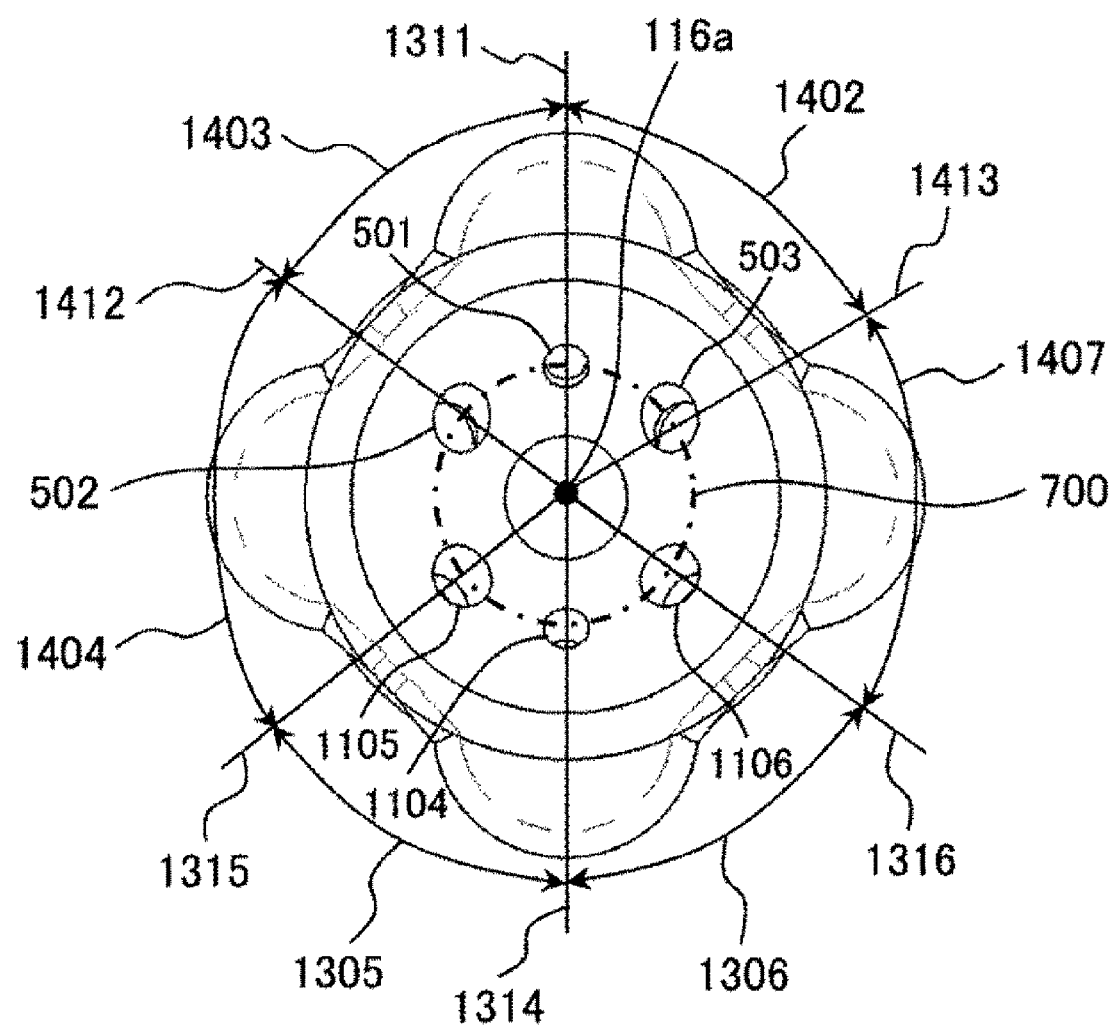
FIG. 14 is an enlarged plan view of an injection hole formation member according to an embodiment (fourth embodiment) of the present invention when viewed from the inner side (valve body side).

FIG. 14 is an enlarged plan view of an injection hole formation member according to an embodiment (fourth embodiment) of the present invention when viewed from the inner side (valve body side).

FIG. 14 is a plan view in which a seat surface 601, a center axis 116a of an injection hole formation member 116, and injection holes 501 to 503 and 1104 to 1106 are projected on a plane perpendicular to the center axis 116a of the injection hole formation member 116 and a center axis 100a of a fuel injection device 100.

The fourth embodiment is different from the third embodiment in that injection hole centerlines connecting the center axis 116a of the injection hole formation member 116 and intersections (center positions of inlet opening surfaces of injection holes) of the seat surface 601 and center axes of the injection holes 501 to 503 and 1104 to 1106 are shown by reference numerals 1311, 1412, 1413, and 1314 to 1316. In this embodiment, the center points of the inlet opening surfaces of the injection holes 501 to 503 and 1104 to 1106 are located on a circumference 700. The center points of the inlet opening surfaces of the injection holes 501 to 503 and 1104 to 1106 do not need to be located on the circumference 700. However, the injection holes 501 to 503 and 1104 to 1106 are preferably arranged such that the inlet opening surfaces of the injection holes 501 to 503 and 1104 to 1106 cover the circumference 700.

When the injection hole centerlines 1311, 1412, 1413, and 1314 to 1316 of the injection holes adjacent to each other are compared, injection hole centerline angles 1403 and 1402 formed by the injection hole centerline 1311 passing through the first injection hole 501 and the injection hole centerlines 1412 and 1413 passing through the second injection holes 502 and 503 are smaller than injection hole centerline angles 1404 and 1407 formed by the injection hole centerlines 1315 and 1316 passing through the fourth injection holes 1105 and 1106 and the injection hole centerlines 1412 and 1413 passing through the second injection holes 502 and 503.

In the configuration in the fourth embodiment, by causing the second injection holes 502 and 503 to be close to the side of the first injection hole 501, that is, by decreasing the injection hole centerline angles 1402 and 1403, interference between the spray D1 of the first injection hole 501 and the sprays D2 and D3 of the second injection holes 502 and 503 becomes strong and the penetration of the spray D1 can be shortened (refer to FIG. 12). As a result, fuel adhesion to a cylinder inner wall surface 210 is suppressed, so that PN can be reduced. In the case of this configuration, the injection hole centerline angles 1404 and 1407 formed by the second injection holes 502 and 503 and the fourth injection holes 1105 and 1106 may be increased. In this case, although the interference between the spray between the sprays D2 and D3 and the sprays D5 and D6 becomes weak, the sprays D5 and D6 in the fourth injection holes 1105 and 1106 are sprays injected diagonally to the piston 209. For this reason, even when the penetration is lengthened, sensitivity to PN is low. Therefore, according to the configuration of the fourth embodiment, a total amount of sprays adhered to the piston 209 and the cylinder inner wall surface 210 can be reduced.

The configuration of the injection hole position in the fourth embodiment may be used in combination with the configuration of the first embodiment.

Fifth Embodiment

Figure 15:
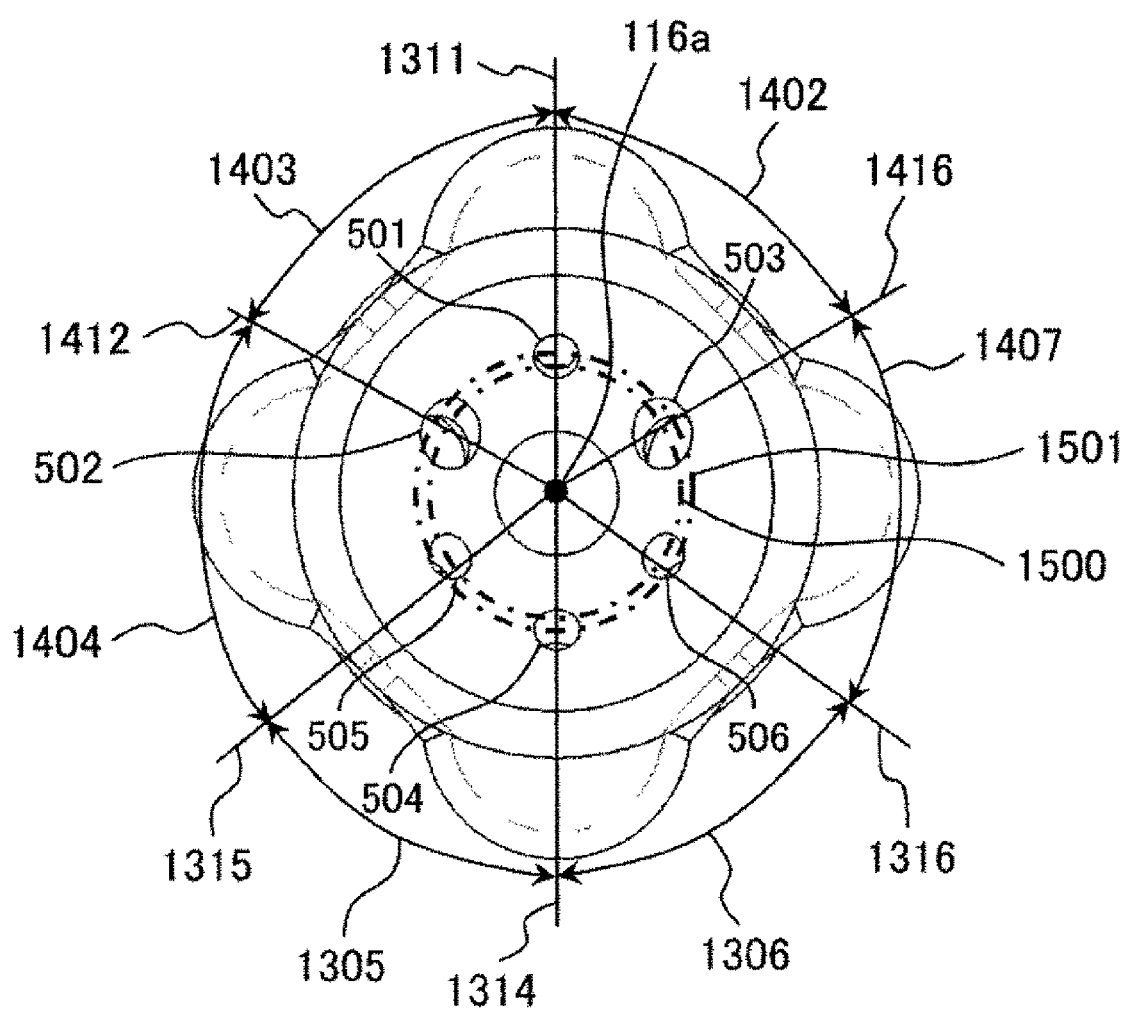
FIG. 15 is an enlarged plan view of an injection hole formation member according to an embodiment (fifth embodiment) of the present invention when viewed from the inner side (valve body side).

A fifth embodiment of the present invention will be described using FIG. 15. In this embodiment, for the same components and configurations as those in the other embodiments, the same reference numerals as those in the other embodiments are used. FIG. 15 is an enlarged plan view of an injection hole formation member according to an embodiment (fifth embodiment) of the present invention when viewed from the inner side (valve body side).

The fifth embodiment is different from the first embodiment in that a first injection hole 501 is arranged on a circumference 1501 on a seat surface 601 with a center axis 116a of an injection hole formation member 116 as a center and second injection holes 502 and 503 are arranged on a circumference 1500 on the seat surface 601 with the center axis 116a of the injection hole formation member 116 as the center. That is, a center of an inlet opening surface of the first injection hole 501 is arranged on the circumference 1501 and centers of inlet opening surfaces of the second injection holes 502 and 503 are arranged on the circumference 1500. In this case, the circumference 1501 has a larger radius than the circumference 1500 and the circumference 1501 is located closer to an outer circumferential side of the injection hole formation member 116 than the circumference 1500.

In a configuration in the fifth embodiment, an injection hole position of the first injection hole 501 is configured to be closer to the outer diameter side than the circumference 1500 passing through center axes of the second injection holes 502 and 503, so that fuel flowing from a volume 801 (refer to FIG. 9) of a tip of a valve body 114 easily flows into the second injection holes 502 and 503 located closer to the inner circumferential side than the first injection hole 501. Therefore, an amount of fuel flowing into the first injection hole 501 decreases. As a result, separation of fuel from an injection hole wall surface 802 (refer to FIG. 8) decreases, a flow rate in an injection hole outlet can be equalized, and a maximum value of a flow rate vector can be reduced. Therefore, the penetration of the first injection hole 501 can be shortened and PN can be suppressed. The configuration according to the fifth embodiment may be used in combination with the configuration according to the second embodiment. When the configuration is combined with the configuration in the second embodiment, the first injection hole 501 and the third injection hole 1104 may be arranged on the circumference 1501 and the second injection holes 502 and 503 and the fourth injection holes 1105 and 1106 may be arranged on the circumference 1500. By this configuration, the penetration of the third injection hole 1104 can be reduced and fuel adhesion to a piston 209 can be suppressed to reduce PN.

Sixth Embodiment

A sixth embodiment of the present invention will be described using FIGS. 16 and 17. In this embodiment, for the same components and configurations as those in the other embodiments, the same reference numerals as those in the other embodiments are used.

Figure 16:
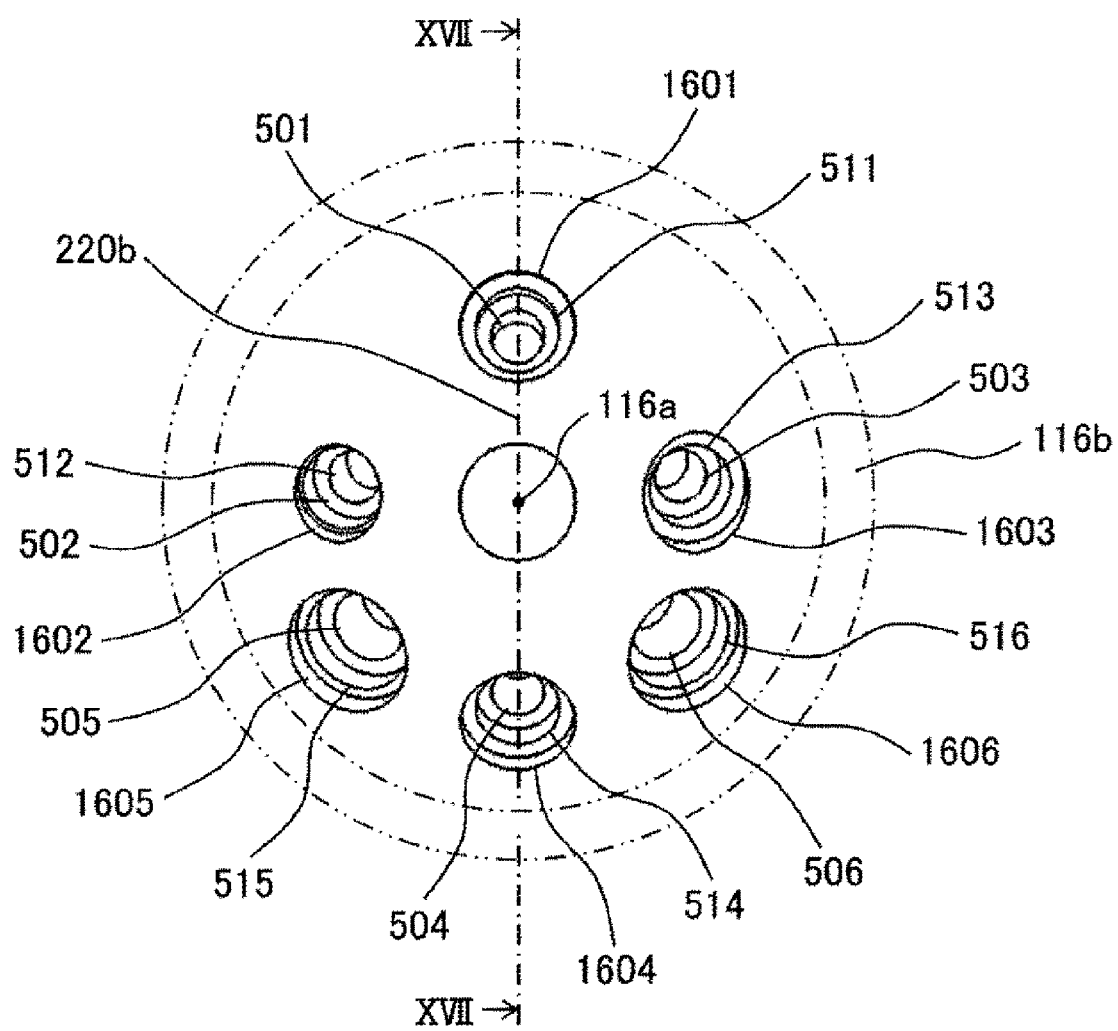
FIG. 16 is a plan view of an injection hole formation member of a fuel injection device according to an embodiment (sixth embodiment) of the present invention when viewed from an apical direction.

FIG. 16 is an enlarged plan view of an injection hole formation member of a fuel injection device according to an embodiment (sixth embodiment) of the present invention when viewed from an apical direction.

The sixth embodiment is different from the first embodiment in that counterbore portions 1601 to 1606 having larger inner diameters than counterbore portions 511 to 516 of the respective upstream sides thereof are configured on the downstream sides of the counterbore portions 511 to 516 of injection holes 501 to 506. That is, the downstream-side counterbore portions 1601 to 1606 are formed on the downstream sides of the upstream-side counterbore portions 511 to 516, so that multi-stage (two-stage) counterbore portions 511 & 1601, 512 & 1602, 513 & 1603, 514 & 1604, 515 & 1605, and 516 & 1606 are configured on the downstream sides of the injection holes 501 to 506.

In the configuration of the sixth embodiment, the inner diameters of the downstream-side counterbore portions 1601 to 1606 are configured to be larger than the inner diameters of the upstream-side counterbore portions 511 to 516, so that fuel injected from the injection holes 501 to 506 can be easily suppressed from adhering to the downstream-side counterbore portions 1601 to 1606. Because the fuel injected from the injection holes 501 to 506 has a rate vector of a turning direction with respect to a center axis 119a of the injection hole, the fuel has an angle β with respect to the center axis 119a of the injection hole.

Figure 17:
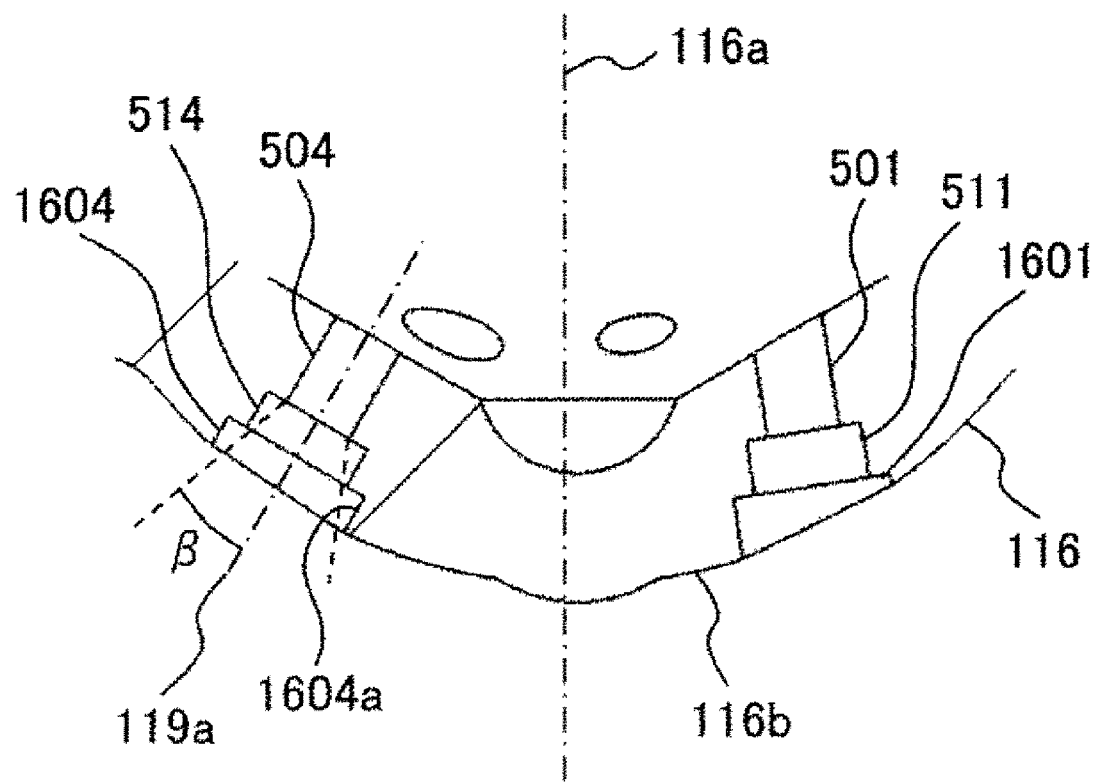
FIG. 17 is a diagram showing the injection hole formation member according to the embodiment (sixth embodiment) of the present invention and is a cross-sectional view showing a cross-section taken along XVII-XVII of FIG. 16.

FIG. 17 is a diagram showing the injection hole formation member according to the embodiment (sixth embodiment) of the present invention and is a cross-sectional view showing a cross-section taken along XVII-XVII of FIG. 16. In FIG. 17, a valve body 114 is omitted Hereinafter, the injection hole 504 is described. However, the same is applied to the other injection holes 501 to 503, 505, and 506.

If the inner diameter of the upstream-side counterbore portion 514 is increased to suppress the fuel adhesion to the upstream-side counterbore portion 514, a distance between a fuel spray and an inner circumferential surface 1604a of the upstream-side counterbore portion 514 increases and an effect of cleaning a carbon deposition material (deposit) by the injected fuel decreases. As a result, the generated deposit is deposited in the upstream-side counterbore portion 514 and the fuel permeates from the deposit portion, so that PN may increase.

According to the method in the sixth embodiment, the downstream-side counterbore portion 1604 is provided, so that adhesion of the fuel spray to the upstream-side counterbore portions 511 to 816 and the downstream-side counterbore portions 1601 to 1606 can be suppressed while the distance between the fuel spray and the upstream-side counterbore portion 514 is decreased. Therefore, an effect of suppressing PN is heightened.

In addition, the inner diameters of the downstream-side counterbore portions 1601 to 1606 may be determined according to the inner diameters of the upstream-side counterbore portions 511 to 516 or the inner diameters (hole diameters) of the injection holes 501 to 506. When the injection hole diameter or the inner diameter of the upstream-side counterbore portion is large, the inner diameter of the downstream-side counterbore portion 1604 is increased, so that fuel adhesion to the downstream-side counterbore portion can be reduced, and PN can be suppressed.

Even in this embodiment, a cross-sectional shape of each of the upstream-side counterbore portions 511 to 816 and the downstream-side counterbore portions 1601 to 1606 may be a shape other than a circular shape (perfect circle), for example, an elliptical shape. When the cross-sectional shape perpendicular to the center axes of the upstream-side counterbore portion and the downstream-side counterbore portion is the shape other than the perfect circle, the shape of each counterbore portion may be determined such that a cross-sectional area of each counterbore portion instead of the inner diameter satisfies the relation described above.

The present invention is not limited to the embodiments described above and various modifications are included. For example, the embodiments are described in detail to facilitate the description of the present invention and the present invention is not limited to including all of the configurations. In addition, a part of the configurations of the certain embodiment can be replaced by the configurations of other embodiments or the configurations of other embodiments can be added to the configurations of the certain embodiment. In addition, for a part of the configurations of the individual embodiments, addition/removal/replacement of other configurations can be performed.

REFERENCE SIGNS LIST 100 fuel injection device
101 nozzle holder
102 movable element
103 housing
104 bobbin
105 coil
107 magnetic core
110 spring
112 zero spring
113 rod guide
114 valve body
116 injection hole formation member
118 valve seat
119 injection hole
120 guide portion
124 adjuster pin
153 drive circuit
154 ECU
203 ignition plug
205, 205a, 205b intake valve
209 piston
211 exhaust valve
220 cylinder
501 first injection hole
502, 503 second injection hole
504 to 506 injection hole
1104 third injection hole
1105, 1106 fourth injection hole
511 to 516 first counterbore portion
1114 to 1116 counterbore portion
1601 to 1606 second counterbore portion

The invention claimed is:
1. A fuel injection device including a valve body, a seat surface to perform sealing of fuel in contact with the valve body, and a plurality of injection holes each of which have an inlet opening surface formed on the seat surface, wherein
the plurality of injection holes include:
a first injection hole disposed at a first position located a first distance from a center of the seat surface,
two second injection holes each respectively disposed at a second position and a third position and each located the first distance from the center of the seat surface, the second position and the third position each disposed a second distance from the first injection hole in a circumferential direction around the center of the seat surface, and the second position and the third position are each disposed so as to be adjacent to the first injection hole in the circumferential direction, and at least one other injection hole, the first injection hole is larger than the second injection holes in an injection hole angle formed by a normal direction of the seat surface at an inlet opening surface center of each of the respective plurality of the injection holes and a center axis of each of the respective plurality of the injection holes, the second injection holes are each larger than the first injection hole in an area of a cross-section perpendicular to the center axis of each of the respective plurality of the injection holes, and the first injection hole and the second injection holes are configured such that a ratio of the fuel injected from each of the second injection holes is relatively larger than a ratio of the fuel injected from the first injection hole, the first injection hole and the second injection holes are disposed such that an amount of fuel flowing through the first injection hole is reduced as compared with a case where an area of the cross section of each of the second injection holes is a same size as an area of the cross section of the first injection hole.

2. The fuel injection device according to claim 1, wherein among the plurality of injection holes, the injection hole angle in the first injection hole is larger than the injection hole angles of the remaining plurality of injection holes, and the area of the cross-section perpendicular to the center axis of the injection hole in the first injection hole is smaller than the area of the cross-section perpendicular to the center axis of the remaining plurality of injection holes.

3. The fuel injection device according to claim 1, wherein the plurality of injection holes include, in addition to the first injection hole and the second injection hole, the at least one other injection hole a third injection hole and two fourth injection holes arranged to sandwich the third injection hole in the circumferential direction around the center of the seat surface and the area of the cross-section perpendicular to the center axis of the injection hole in the fourth injection hole is larger than the area of the cross-section perpendicular to the center axis of the injection hole in the third injection hole.

4. The fuel injection device according to claim 3, wherein the third injection hole is arranged on the side opposite to the first injection hole with the center of the seat surface therebetween.

5. The fuel injection device according to claim 1, wherein the fuel injection device is attached to a cylinder direct injection type internal combustion engine, in a state where a fuel spray injected from the first injection hole is oriented to a side of an ignition plug arranged in a cylinder.

6. The fuel injection device according to claim 1, wherein the fuel injection device is attached to a cylinder direct injection type internal combustion engine, in a state where a fuel spray injected from the first injection hole is oriented to a side of a piston moving in a cylinder.

7. The fuel injection device according to claim 1, wherein the cross-section perpendicular to the center axis of the injection hole is formed circularly in each of the first injection hole and the second injection holes, a first counterbore portion having a first inner diameter larger than a first hole diameter of the first injection hole is formed on a first downstream side of the first injection hole, second counterbore portions each having a second inner diameter larger than a second hole diameter of the second injection holes formed on a second downstream side of the second injection holes, and the inner diameter of the first counterbore portion is smaller than the inner diameter of the second counterbore portions.

8. The fuel injection device according to claim 1, wherein the at least one other injection hole include two fourth injection holes arranged on the side opposite to the first injection hole with respect to the two second injection holes and adjacent to the two second injection holes, in the circumferential direction around the center of the seat surface, and when a first injection hole centerline connecting a center axis of the first injection hole and the center of the seat surface, a second injection hole centerline connecting a center axis of the second injection hole and the center of the seat surface, and a fourth injection hole centerline connecting a center axis of the fourth injection hole and the center of the seat surface are imagined on the seat surface, a first injection hole centerline angle formed by the first injection hole centerline and the second injection hole centerline is smaller than a second injection hole centerline angle formed by the second injection hole centerline and the fourth injection hole centerline.

9. A cylinder direct injection type fuel injection device including a valve body, a seat surface to perform sealing of fuel in contact with the valve body, and a plurality of injection holes each of which have an inlet opening surface formed on the seat surface, wherein the plurality of injection holes include a third injection hole configured to inject a spray oriented to a side of a piston moving in a cylinder and two fourth injection holes each arranged at positions so as to be adjacent to the third injection hole in a circumferential direction around a center of the seat surface, such that a plurality of the injection holes are equidistant from the center of the seat surface, and the fourth injection holes are larger than the third injection hole in an area of a cross-section perpendicular to a center axis of the injection hole.

* * * * *